US008342395B1

(12) United States Patent
Muschellack et al.

(10) Patent No.: US 8,342,395 B1
(45) Date of Patent: *Jan. 1, 2013

(54) CARD ACTIVATED CASH DISPENSING AUTOMATED BANKING MACHINE

(75) Inventors: Erich Muschellack, Sao Paulo (BR); Marcelo Soares de Castro, Sao Paulo (BR); Luiz Alexandre Lopez de Oliveira, Sao Paulo (BR)

(73) Assignee: Diebold Self-Service Systems, North Canton, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/136,373

(22) Filed: Jul. 29, 2011

Related U.S. Application Data

(60) Continuation of application No. 12/002,836, filed on Dec. 17, 2007, now Pat. No. 7,988,039, which is a division of application No. 10/746,865, filed on Dec. 26, 2003, now Pat. No. 7,309,004.

(60) Provisional application No. 60/436,719, filed on Dec. 26, 2002, provisional application No. 60/487,754, filed on Jul. 15, 2003.

(51) Int. Cl.
G06Q 40/00 (2006.01)
G07D 11/00 (2006.01)
G07F 19/00 (2006.01)

(52) U.S. Cl. ......................................................... 235/379
(58) Field of Classification Search .................... 235/379
See application file for complete search history.

(56) References Cited

U.S. PATENT DOCUMENTS

| 6,175,922 | B1 * | 1/2001 | Wang .............................. 713/182 |
| 6,520,410 | B2 * | 2/2003 | Putman et al. ................. 235/380 |
| 6,609,114 | B1 * | 8/2003 | Gressel et al. ................... 705/50 |
| 7,635,084 | B2 * | 12/2009 | Wang et al. ..................... 235/379 |
| 7,988,039 | B1 * | 8/2011 | Muschellack et al. ......... 235/379 |
| 2002/0004905 | A1 * | 1/2002 | Davis et al. .................... 713/193 |

* cited by examiner

*Primary Examiner* — Tuyen K Vo
(74) *Attorney, Agent, or Firm* — Christopher L. Parmelee; Ralph E. Jocke; Walker & Jocke

(57) ABSTRACT

An automated banking machine operates to cause financial transfers responsive to data read from data bearing records. The automated banking machine includes a card reader operative to read card data from user cards corresponding to financial accounts. The automated banking machine may include a display and a printer to produce records of financial transactions carried out with the machine. The automated banking machine is operative to authenticate firmware in at least one hardware component of the machine prior to causing the at least one hardware component to carry out a transaction function.

20 Claims, 10 Drawing Sheets

CARD ACTIVATED CASH DISPENSING AUTOMATED BANKING MACHINE

CROSS REFERENCE TO RELATED APPLICATIONS

This application is a continuation of U.S. application Ser. No. 12/002,836 filed Dec. 17, 2007, which is a divisional of U.S. application Ser. No. 10/746,865 filed Dec. 26, 2003, which claims benefit of U.S. Provisional Application Ser. Nos. 60/436,719 filed Dec. 26, 2002 and 60/487,754 filed Jul. 15, 2003.

TECHNICAL FIELD

An exemplary embodiment relates to automated banking machines that operate to cause financial transfers responsive to data read from data bearing records which may be classified in U.S. Class 235, Subclass 379.

BACKGROUND

Automated banking machines are well known. A common type of automated banking machine used by consumers is an automated teller machine. Automated teller machines enable customers to carry out banking transactions. Common banking transactions that may be carried out with automated teller machines include the dispensing of cash, the making of deposits, the transfer of funds between accounts, the payment of bills and account balance inquiries. The types of banking transactions a customer can carry out are determined by capabilities of the particular banking machine and the programming of the institution operating the machine. Other types of automated banking machines may allow customers to charge against accounts or to transfer funds. Other types of automated banking machines may print or dispense items of value such as coupons, tickets, wagering slips, vouchers, checks, food stamps, money orders, scrip or traveler's checks. For purposes of this disclosure an automated teller machine, an automated banking machine, or an automated transaction machine shall encompass any device which carries out transactions including transfers of value.

Automated teller machines may include a plurality of devices including for example a CPU processor board, a hard drive, a keypad, and cash dispenser. Automated teller machine cases may have a plurality of designs and shapes. For example, automated teller machines may include a large reinforced security chest or safe which is capable of enclosing both a cash dispenser mechanism and a computer which operates the cash dispenser as well as the other devices of the automated teller machine. In other automated teller machines, the computer of the automated teller machine may be located outside the chest, although still within a locked enclosure or fascia. Unfortunately, an enclosure or fascia may be less secure than a chest and may be pried or cracked open. As a result computers or other automated teller machine devices located outside the chest may have an increased risk of being modified or hacked by unauthorized users. Such modifications may compromise the security of the automated teller machine and improperly cause the automated teller machine to dispense cash or otherwise transfer value to the unauthorized user. Consequently there exists a need for an automated banking machine that has increased protection against unauthorized access to physical hardware devices of the machine.

In addition, automated teller machines are connected to at least one network. Such networks may include private networks which include one or more automated teller machine host banking systems. Such networks may also include public networks such as the Internet. automated teller machines may also use standard Internet protocols to communicate with automated teller machine host banking systems. Such standard protocols may include network protocols such as TCP/IP. As a result automated teller machines which use TCP/IP may be attacked with the same types of hacking tools used to attack web sites, and other types of computer systems on the Internet. Consequently there exists a need for an automated banking machine that has increased protection against unauthorized access to the machine through network communication.

Once an unauthorized user has gained access to the hardware of an automated teller machine, whether by network communication or physical access to the hardware, the unauthorized user may have the opportunity to steal information from the automated teller machine. Such modifications may include the insertion of viruses, worms, and/or sniffer programs which are operative to capture transaction information such as account numbers, personal identification numbers, and other secret information. As a result there further exists a need for an automated banking machine which has increased protection against the theft of transaction information.

OBJECTS OF EXEMPLARY EMBODIMENTS

It is an object of an exemplary form of at least one embodiment to provide an automated banking machine at which a user may conduct transactions.

It is a further object of an exemplary form of at least one embodiment to provide an automated banking machine which is more secure.

It is a further object of an exemplary form of at least one embodiment to provide an automated banking machine that has increased resistance to being attacked by an unauthorized user.

It is a further object of an exemplary form of at least one embodiment to provide an automated banking machine which is operative to prevent unauthorized modifications to the automated banking machine from enabling the theft of cash or transaction information.

Further objects of exemplary forms of at least one embodiment will be made apparent in the following Detailed Description of Exemplary Embodiments and the appended claims.

The foregoing objects may be accomplished in an exemplary embodiment by an automated banking machine that includes output devices such as a display screen and receipt printer. The machine may further include input devices such as a touch screen, keyboard, keypad, function keys, and a card reader. The automated banking machine may further include transaction function devices such as a cash dispenser mechanism for sheets of currency, a depository mechanism and other transaction function devices which are used by the machine in carrying out banking transactions including transfers of value. In the exemplary embodiment the automated banking machine may include at least one computer. The computer may be in operative connection with the output devices and the input devices, as well as with the cash dispenser mechanism, depository mechanism and other physical transaction function devices in the banking machine. The computer may further be operative to communicate with a host system located remotely from the machine.

In the exemplary embodiment, the computer may include software components that are executable therein. The software components of the automated banking machine may be operative to cause the computer to output user interface screens through a display device of the machine. The user interface screens may include consumer screens which provide a consumer with information for performing consumer operations such as banking functions with the machine. The user interface screens may further include service screens which provide an authorized user servicing the machine with information for performing service and maintenance operations with the machine. In addition the machine may include software components operative in the computer for controlling and communicating with hardware devices of the machine including the input devices, output devices and the transaction function devices.

In an exemplary embodiment the automated banking machine includes a plurality of components which may correspond to two or more of the previously described input devices, output devices, transaction function devices, and/or software components. The plurality of components may include a first component and a second component. The first and second components are operative to securely communicate with each other. Such secure communications may include passing encrypted information between each other which is associated with a transaction function being performed by the machine. Such a transaction function may correspond to the dispense of cash or any other function performed by the automated banking machine. The information may be encrypted with a secret key such as a DES key known to both the first and second components. The encrypted information may correspond to account numbers, personal identification numbers (PINs), status information, error information, encryption keys, software function or event calls, operational commands, or any other type of information which may be passed between hardware and/or software components of an automated banking machine for purposes of performing a transaction function.

When the secure communication between the first and second components is being established, the second component of the exemplary embodiment may be operative to authenticate the identity of the first component in order to prevent the possibility of a "man in the middle" hacking attack. Such a "man in the middle" hacking attack may correspond to a software virus, worm, or an imposter hardware device or software component which is constructed to intercept secure communications between components. In one scenario of "a man in the middle" attack the rogue software or hardware component may function as a router which filters the intended communications between the first and second components. Such filtering may enable the rogue component to acquire the secret key or keys used to decrypt the information being communicated between the first and second components. Such filtering may also enable a rogue component to replay sampled communications to cause a hard ware device or other component to repeat a function.

The exemplary embodiment may be operative to prevent "a man in the middle" attack by requiring the first component to authenticate itself to the second component with first identity data which is not generally available to a rogue software or hardware component. Such first identity data may correspond to individual or combinations of unique data embedded within the component. For example such first identity data may correspond to a serial number stored in a hardware device or may be embedded in the software code of a software component.

In the exemplary embodiment, the first component may be operative to generate a unique the secret key which will be used to perform symmetric encryption/decryption of information being communicated between the first and second components. To facilitate the transfer of the secret key to the second component, the second component may include a public and private key set which may be used to perform asymmetric encryption/decryption. In the exemplary embodiment, the first component may be operative to encrypt the secret key with the public key of the second component. The encrypted secret key may then be sent to the second component. The second component may be operative to decrypt the secret key using its private key.

To enable the second component to verify that the encrypted secret key originated from an authentic first component, the first component may be operative to generate at least one first message digest or one-way hash (which as used herein is referred to as a hash), using at least one identity data values embedded in or accessible to the first component. The first hash may be generated by hashing the first identity data with the public key using one-way hash algorithms such as MD5 or SHA-1.

Both the encrypted secret key and the first hash of the first identity data may be sent from the first component to the second component as part of at least one message. In an exemplary embodiment, the first component may further encrypt the first hash with the secret key before sending it to the second component. In other exemplary embodiments, the first component may encrypt a combination of the secret key and first hash with the public key before sending it to the second component.

The second component is operative to decrypt the secret key with the private key of the second component. In embodiments where the first hash is encrypted with the secret key, the second component is further operative to decrypt the first hash using the secret key. In embodiments where a combination of the secret key and the first hash are encrypted with the public key, the second component may be operative to decrypt the combination using the private key to uncover both the secret key and the first hash.

To verify that the secret key originated from an authentic first component and not an imposter first component, the second component may be operative to compare the first hash to a second hash that is expected to correspond to the first component. In an exemplary embodiment, the second component may access a secure data store which includes at least one second identity data which corresponds to the first component. The second component may be operative to cause at least one second hash to be generated by passing the second identity data and the public key through a one-way hash function which is identical to the function used by the first component to generate the first hash.

If the first and second hashes correspond to each other, the second component is operative to permit secure communications between the first and second components to commence using the secret key to encrypt the communications. If the first and second hashes do not correspond to each other, the second component is operative to not establish secure communications between the first and second components using the secret key received from the first component. The second component may also propagate an error message in the automated banking machine which indicates that the first component may not be an authorized first component.

In exemplary embodiments, the described cryptographic processes may be performed by the software components. In addition, in exemplary embodiments the described cryptographic processes may be performed by cryptographic software or hardware module of the automated banking machine responsive to the components. For example an exemplary embodiment of the automated banking machine may include a message protect application which is operative to generate the first and second hashes. In an exemplary embodiment each of the first and second component may call a separate instance of the message protect application. For example, if each of the first and second components include separate processors, each processor may run a version of the message protect application.

In an alternative exemplary embodiment, the automated teller machine may include a trusted platform with a trusted platform module (TPM) and associated software which complies with a trusted computing platform or base specification. The trusted platform may be used to perform all or portions of the cryptographic functions for the software and hardware components of the automated banking machine to establish secure communications between the components.

DETAILED DESCRIPTION OF EXEMPLARY EMBODIMENTS

Figure 1:
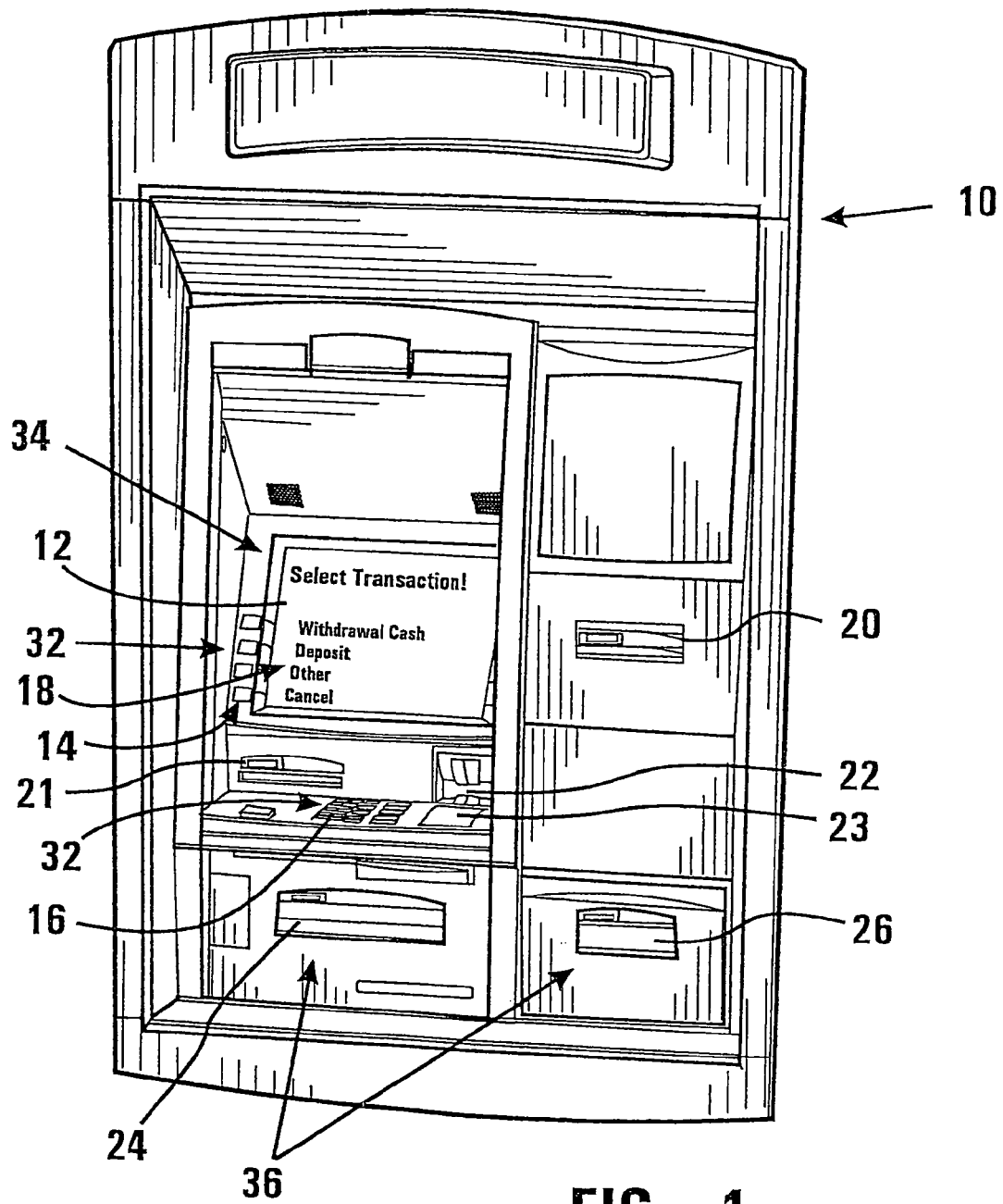
FIG. 1 is a perspective view representative of an exemplary embodiment of an automated banking machine.

Referring now to the drawings and particularly to FIG. 1, there is shown therein a perspective view of an exemplary embodiment of an automated banking machine 10. Here the automated banking machine 10 may include at least one output device 34 such as a display device 12. The output device 12 may be operative to provide a consumer with a user interface 18 that may include a plurality of screens or other outputs including selectable options for operating the machine. The exemplary embodiment may further include other types of output devices such as a receipt printer 20, statement printer 21, speakers, or any other type of device that is capable of outputting visual, audible, or other sensory perceptible information.

The exemplary embodiment of the automated banking machine 10 may include a plurality of input devices 32 such as an encrypting pin pad (EPP) with keypad 16 and function keys 14 as well as a card reader 22 and/or bar code reader 23. The exemplary embodiment of the machine 10 may further include or use other types of input devices, such as a touch screen, microphone, or any other device that is operative to provide the machine with inputs representative of user instructions or information. The machine may also include one or more biometric input devices such as a fingerprint scanner, an iris scanner, facial recognition device, hand scanner, or any other biometric reading device which may be used to read a biometric input that can be used to identify a user.

The exemplary embodiment of the automated banking machine 10 may further include a plurality of transaction function devices which may include for example a cash dispenser 24, a depository mechanism 26, a cash recycler mechanism, or any other type of device which is operative to perform transaction functions involving transfers of value.

Figure 2:
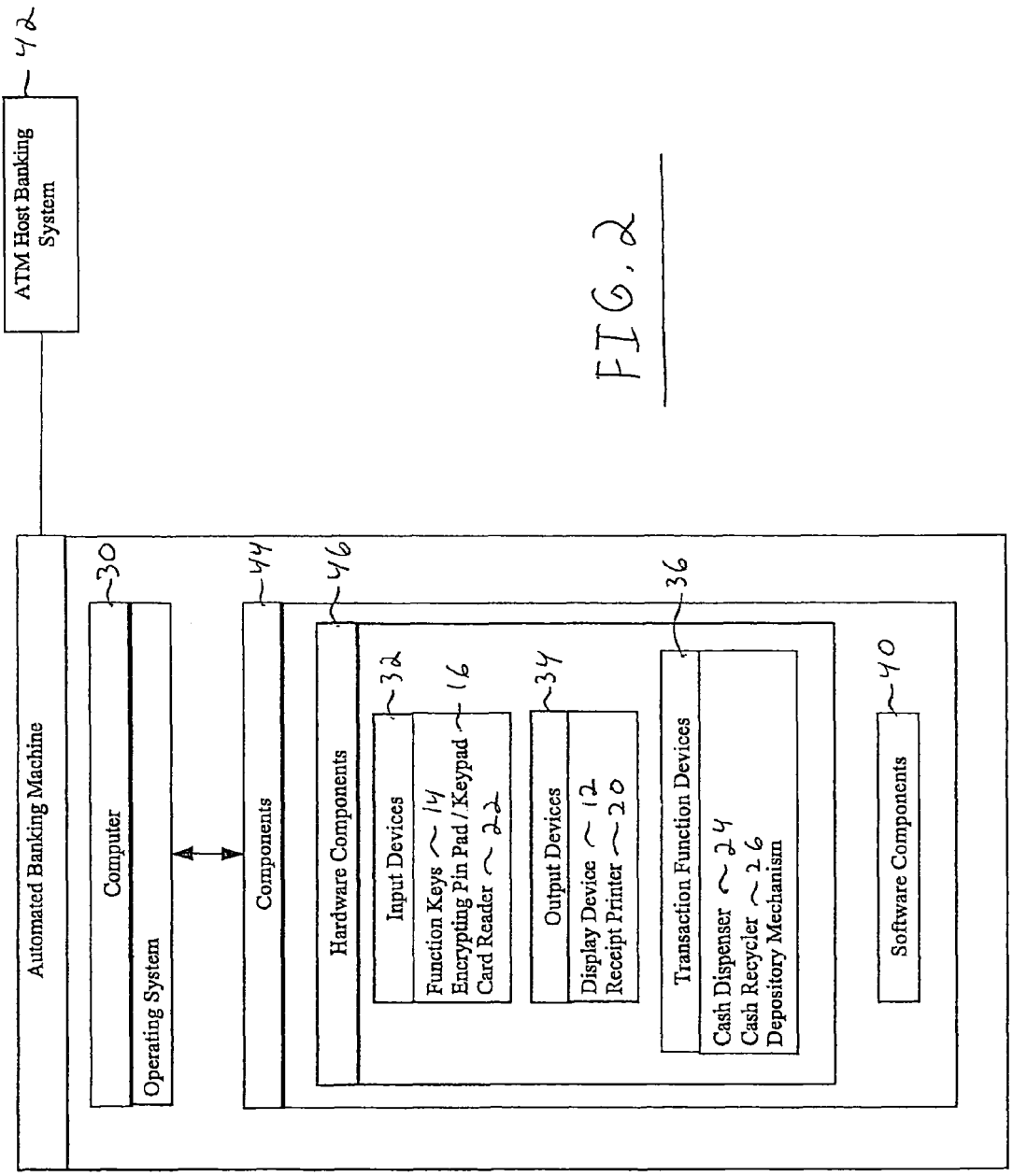
FIG. 2 is a schematic view of a further exemplary embodiment of an automated banking machine.

FIG. 2 shows a schematic view of components which may be included or may be in communication with the automated banking machine 10. Exemplary embodiments of the automated banking machine 10 may be operative to communicate with a transaction processing server which is referred to herein as an automated teller machine (ATM) host banking system 42. Such an ATM host banking system 42 may be operative to authorize the automated banking machine 10 to perform transaction functions for users such as withdrawing cash from an account through operation of the cash dispenser 24, depositing checks or other items with the depository mechanism 26, performing a balance inquiry for a financial account and transferring value between accounts.

In addition, the machine 10 may include at least one computer 30. The computer 30 may be in operative connection with a plurality of components 44. Such components may include both hardware components 46 and software components 40. The hardware components 46 may correspond to the previously described input device(s) 32, output device(s) 34, and transaction function device(s) 36. In an exemplary embodiment, a transaction function device may be operative to perform a transaction function in response to at least one input through at least one of the input devices.

In an exemplary embodiment, the software components may correspond to one or more terminal control software components that are operative in the computer 30. The terminal control software components may be operative to control the operation of the machine by both a consumer and an authorized user such as a service technician. For example such terminal control software components may include applications which enable a consumer to dispense cash, deposit a check, or perform other transaction functions with the machine. In addition the terminal control software components may include applications which enable a service technician to perform configuration, maintenance, and diagnostic functions with the machine.

Figure 3:
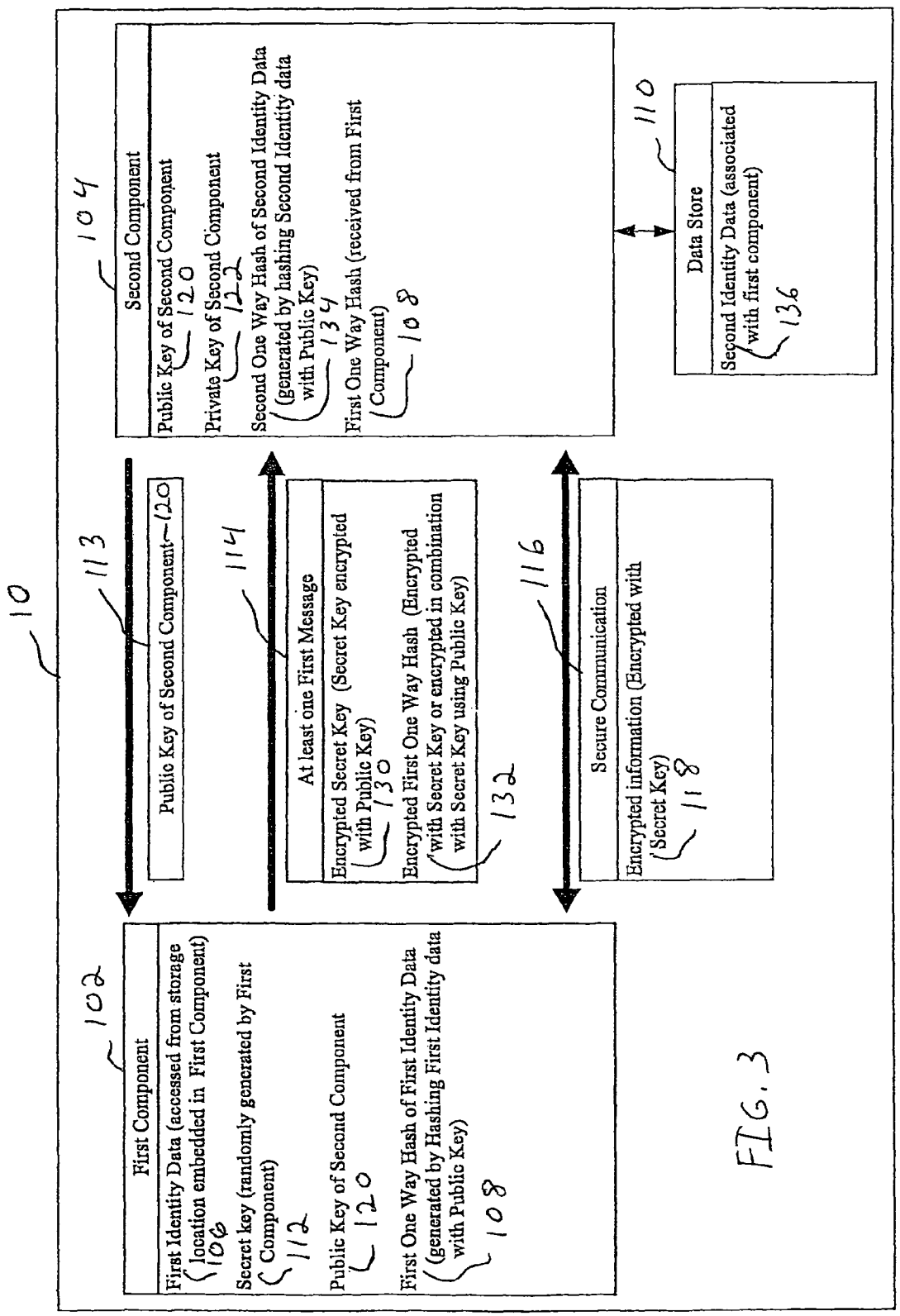
FIG. 3 is a schematic view showing a method for establishing secure communications between components of an automated banking machine.

In an exemplary embodiment both software components and/or hardware components may be operative to communicate information with each other through the computer and/or through a communication system associated with the computer. Such information may be encrypted to protect confidential information from threats of intruders. FIG. 3 shows a schematic view of an exemplary method for establishing secure communications between a plurality of components of the automated banking machine 10. Here the automated banking machine may include at least two components such as a first component 102 and a second component 104. In the exemplary embodiment the first and second components may correspond to software components that are operative in the at least one computer processor of the automated banking machine. In addition in exemplary embodiments either or both of the first and second components may correspond to hardware components. As used herein, it is to be understood that the term component may correspond to either a hardware or software component of the automated banking machine.

The automated banking machine may also include one or more transaction function devices. Such a transaction function device may correspond to one or both of the first or second components 102 and 104. However, a transaction function device may also correspond to a further component in addition to the described first and second components 102, 104.

The first component 102 may be operative to generate a unique secret key 112. The first component 102 may be operative to send at least one first message 114 to the second component which includes the secret key in an encrypted form 130. Subsequent messages 116 communicated between the first and second components may include information 118 which is encrypted with the secret key. In the exemplary embodiment the subsequent messages 116 may be encrypted and decrypted by the first and second components using a symmetrical cryptography algorithm and the secret key. Examples of a symmetrical algorithms which may be used to encrypt the messages 116 may include DES or AES cryptography algorithms.

In the exemplary embodiment, the secret key may be uniquely generated by the first component each time the first component and second component attempt to establish a secure and encrypted channel of communication between each other. In addition, to prevent the secret key from being discovered from the first message 114, the exemplary embodiment of the first component may be operative to encrypt the secret key using an asymmetric cryptography algorithm and a public key associated with the second component. The asymmetric cryptography algorithm may include RSA or other public/private key cryptography algorithm. The resulting encrypted secret key 130 in the first message 114, may be decrypted by the second component using the asymmetric cryptography algorithm and a private key 122 of the second component. The first component 102 may be operative to acquire the public key 120 of the second component from a message 113 sent from the second component. In alternative exemplary embodiments, the first component 102 may be operative to acquire the public key 120 from a data store of public keys.

In the exemplary embodiment, the second component may be operative to verify or authenticate that the secret key received in the message 114 originated from the first component. To enable such authentication, the first component 102 may include a first identity data 106. Such first identity data may be embedded in at least one secure storage location within the component or may be accessed by the component from associated software and/or hardware devices. For example, in a hardware component, the first identity data may correspond to a serial number or sub-byte identification hardware codes or other non-volatile memory device in the hardware component. In a software component, the first identity data may correspond to a unique identification number stored in the software code of the software component. In addition, in exemplary embodiments, the identity data may be comprised of a combination of different portions of information securely stored in the component or accessed by the component from different components.

In the exemplary embodiment, the first component is operative to generate at least one first authentication hash of the at least one first identity data. Such a first hash may be generated by hashing both the first identity data and the public key of the second component that was used to encrypt the secret key. The term hash as used herein corresponds to a non-reversible value generated by passing data such as a combination of the identity data and the public key through a one-way hash function. Examples of a one-way hash function for use with exemplary embodiments include MD5 and SHA-1 or any other function which is operative to generate a non-reversible hash value from a combination of the first identity data and the public key.

In the exemplary embodiment, the first hash may be encrypted. The resulting encrypted first hash 132 may be sent to the second component in the at least one first message 114. In an exemplary embodiment, the first hash may be encrypted with the secret key 112 generated by the first component. In an alternative exemplary embodiment, the first hash may be combined with the secret key and the resulting combination may be encrypted with the public key 120 of the second component.

When the at least one first message 114 is received, the second component may be operative to decrypt the encrypted first hash 132 to reveal the first hash 108. In exemplary embodiments where the first hash is encrypted using the secret key, the second component may decrypt the first hash using the secret key received from the first component. In exemplary embodiments, where the first hash and secret key are encrypted together as a combination using the public key 120, the second component may be operative to decrypt the combination using the private key 122 of the second component.

In the exemplary embodiment, the second component may be operative to access at least one second authentication hash 134 which is associated with the first component 102. The second hash 134 may correspond to the hashing of at least one second identity data 136 and the public key 120 using the same hash function as was used to generate the first hash 108. The automated banking machine 10 may be configured such that the second identity data 136 is identical to the first identity data 106 if the first component is authentic and has been properly configured in the machine. As a result the first hash 108 and the second hash 134 will match when the first message 114 is from an authentic first component. The exemplary embodiment of the second component may be operative to compare the first hash to the second hash to verify that they are identical. If the first and second hashes are identical the second component may be operative to enable secure communications or messages 116 to be sent between the first and second components which include information 118 encrypted with the secret key 112. If the first and second hashes are not the same, the second component may be operative to propagate a status or error message in the automated banking machine which indicates that the second component failed to establish a secure communication session or channel with the first component.

In the exemplary embodiment, the second component 104 may be operative to access the second identity data 136 and generate the second hash 134 from the second identity data 136 and its public key 120. In exemplary embodiment the second identity data 136 may be accessed from a data store 110 that is in operative connection with the second component. Such a data store 110 may be operative to securely store the second identity data to deny unauthorized access to the second identity data from the data store.

In an exemplary embodiment the data store 110 may be included in the second component 104. For example, if the component corresponds to a hardware device the data store 110 may correspond to a flash RAM or other nonvolatile memory of the hardware device. In other exemplary embodiments the data store may correspond to a data store component that is accessible to a plurality of components and includes identity data for a plurality of components. Components may securely access the data store component and retrieve identity data related to other components that are being authenticated. Such a data store component may itself correspond to the described first and/or second components and be operative to authenticate other components prior to enabling the components to access the identity data.

In an alternative exemplary embodiment, in which the computer of the ATM may include a trusted platform module (TPM) chip, the identity data may be stored in a secure data store managed by a trusted platform that uses TPM chip of the computer. Such a trusted platform may comply with a trusted platform specification released by the Trusted Computing Platform Alliance (TCPA) specification and/or Trusted Computing Group (TCA) or other current or future specification for establishing a trusted and secure computing environment. Examples of trusted platforms include the Microsoft next-generation secure computing base (NGSCB) (formerly called Palladium) and the Intel LaGrande Technology for example.

Also, in a further exemplary embodiment, rather than having the second component generate the second hash 134, the secure data store 110 and/or associated software may be operative to generate the second hash 134 and securely send the second hash 134 to the second component. In this described exemplary embodiment, the data store 110 may receive or have access to the public key of the second component and may pass both the second identity data 136 and the public key 120 of the second component through a one-way hash function to generate the second hash 134. To prevent a rogue component from intercepting the second hash 134, the data store 110 may further encrypt the second hash 134 using the public key 120 of the second component. The second component may then decrypt the encrypted second hash 134 using its private key 122.

In the exemplary embodiment, the automated banking machine may include a user interface and/or a dedicated input device that is operative to enable an authorized user to maintain or update the identity data stored in the data store 110. When new or updated hardware or software components are installed in the automated banking machine 10, the data base 110 may be updated to include the new identity data values which correspond to the new components. As will be discussed in more detail below, such a dedicated input or transaction function device may include a button accessible only with a secure area of the ATM such as the chest of the ATM. The button may be configured to cause the data store to be updated with new identity data for components currently installed in the ATM.

In alternative exemplary embodiments, the data store 110 or other data stores in the machine may include copies of the public keys for the components. Rather than having the components receive public keys from other components, the components may retrieve public keys for other components from a data store of public keys. In such alternative exemplary embodiment, data stores which include identity data and/or public keys may be operative to securely communicate with components to prevent intrusions or rogue components from performing "man in the middle" attacks between the components.

In exemplary embodiments, the components may include or have access to applications which provide cryptographic functions for performing, encryption, decryption, digital signature signing, digital signature verification, hashing and/or other cryptographic calculations as described herein. For example, as will be discussed in more detail below, the components may include or have access to a message protect application which is callable by the components and is operative to perform all or portions of the described steps for establishing a secure communication session between components.

In alternative exemplary embodiments, the automated banking machine may include dedicated software and hardware components which are operative to perform general cryptographic calculations on behalf of the calling components and/or a message protect application. For example, an ATM may include a dedicated hardware card or chip for performing cryptographic calculations such as random number generation, hashing, and DES encryption/decryption. For computers of the ATM that include a TPM chip or other cryptographic hardware, the cryptographic hardware and associated software may be operative to perform or manage cryptographic calculations responsive to software and hardware components of the automated banking machine.

Figure 4:
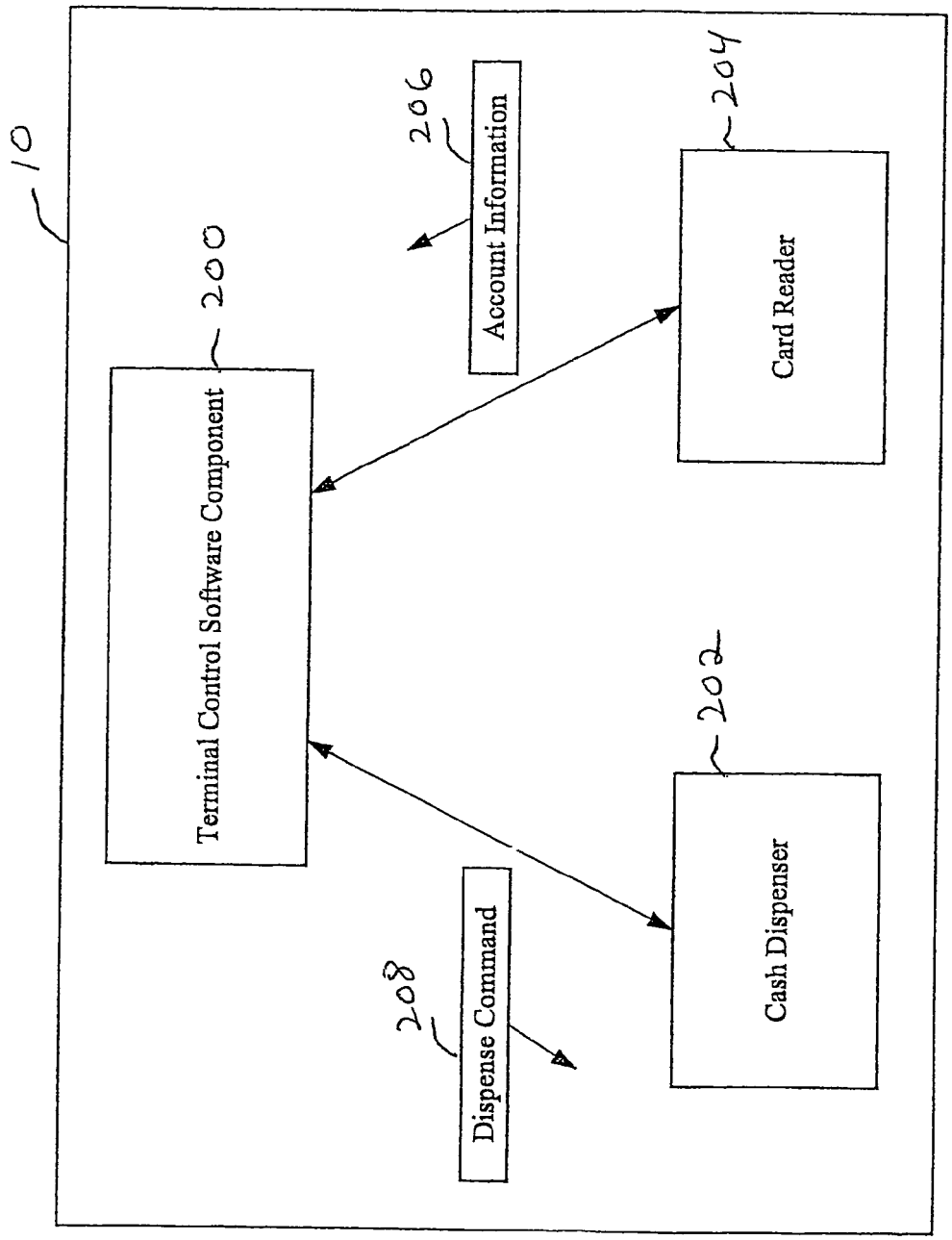
FIG. 4 is a schematic view showing secure communications between terminal control software components and a cash dispenser and a card reader of an automated banking machine.

FIG. 4 shows an example of using the previously described system for authenticating components to perform a transaction function. Here the automated banking machine 10 includes a card reader 204, a cash dispenser 202, and terminal control software 200. The exemplary embodiment of the terminal control software 200 may include one or more software components such as a device driver which corresponds to at least one of the first components previously described. The exemplary embodiments of the card reader 204 and cash dispenser 202 may correspond to the second components previously described.

To perform a transaction function such as the dispensing of cash, the terminal control software components may require account information to be read from a card using the card reader 204. To prevent intrusion such as a virus, worm or rogue component from intercepting the account information and to prevent a "man in the middle" attack, the previously described method of establishing a secure channel of communication may be used. In this example the card reader may be operative to encrypt the account information 206 being sent to the terminal control software using a secret key generated by the terminal control software. In addition the card reader may authenticate that the secret key was generated by an authentic terminal control software component 200, by comparing at least one first authentication hash to at least one second authentication hash as discussed preciously. In this example the first and second hashes may be generated by passing a public key of the card reader and at least one identity data associated with or accessed by the terminal control software component through a one-way hash function.

To cause the automated banking machine to dispense cash, the terminal control software components 200 may pass a command to the cash dispenser device which indicates an amount to dispense. To prevent intrusions such as rogue software or hardware component from being able to control the cash dispenser, the previously described method of establishing a secure communication session between the terminal control software and the cash dispenser may be used. In this example the terminal control software may be operative to encrypt the command instruction 208 to dispense an amount of cash using a secret key generated by the terminal control software. In addition the cash dispenser may verify that the secret key was generated by an authentic terminal control software component 200, by comparing at least one first authentication hash to at least one second authentication hash as discussed previously. In this example the first and second hashes may be generated by passing a public key of the cash dispenser and at least one identity data associated with or accessed by the terminal control software component through a one-way hash function.

In this described exemplary embodiment, the card reader 204 and/or cash dispenser 202, may be operative to establish a secure communication session with one or more terminal control software components 200. In other exemplary embodiments, other hardware devices and/or software components of the machine may be operative to establish secure communication sessions between each other using the previously described methods. Also, individual components of the machine may correspond to a combination of the previously described first and second components and thus be able to authenticate other components as well as being able to be authenticated by other components as previously described.

In the previously described exemplary embodiment, a single identity data value such as a serial number may be used to authenticate a component. However, in alternative exemplary embodiments, a component may be authenticated using more than one identity data value. When all of the identity data values have been validated by a component, a secure communication session may be established, and the components may be informed that the session may be fully trusted. When less than all of the identity data values have been authenticated, the components may continue to establish a secure communication session; however, the components may be informed that the session should only be partially trusted. As a result the components may be programmed to only permit a subset of operations to be performed responsive to the communication between the components.

In addition, exemplary embodiments of the previously described method may further include a unique session identification value or SessionID. A different SessionID may be generated for each attempt to establish a secure communications session between two components. Such a SessionID may be used to prevent a rogue application from recording handshaking communications between original components and replaying the communications to establish a secure communication with one of the original component.

Also, in further exemplary embodiments after the secret key has been successfully transferred between components, each of the components may be operative to independently produce identical hashes of the secret key. The hashes may be used to encrypt and decrypt messages sent between the components. For each subsequent message a different hash derived from the original secret key may be generated for use in encrypting and decrypting each new message. As a result, even though the content of two or more messages may be identical, the corresponding encrypted form of those identical messages will be different.

Figure 5:
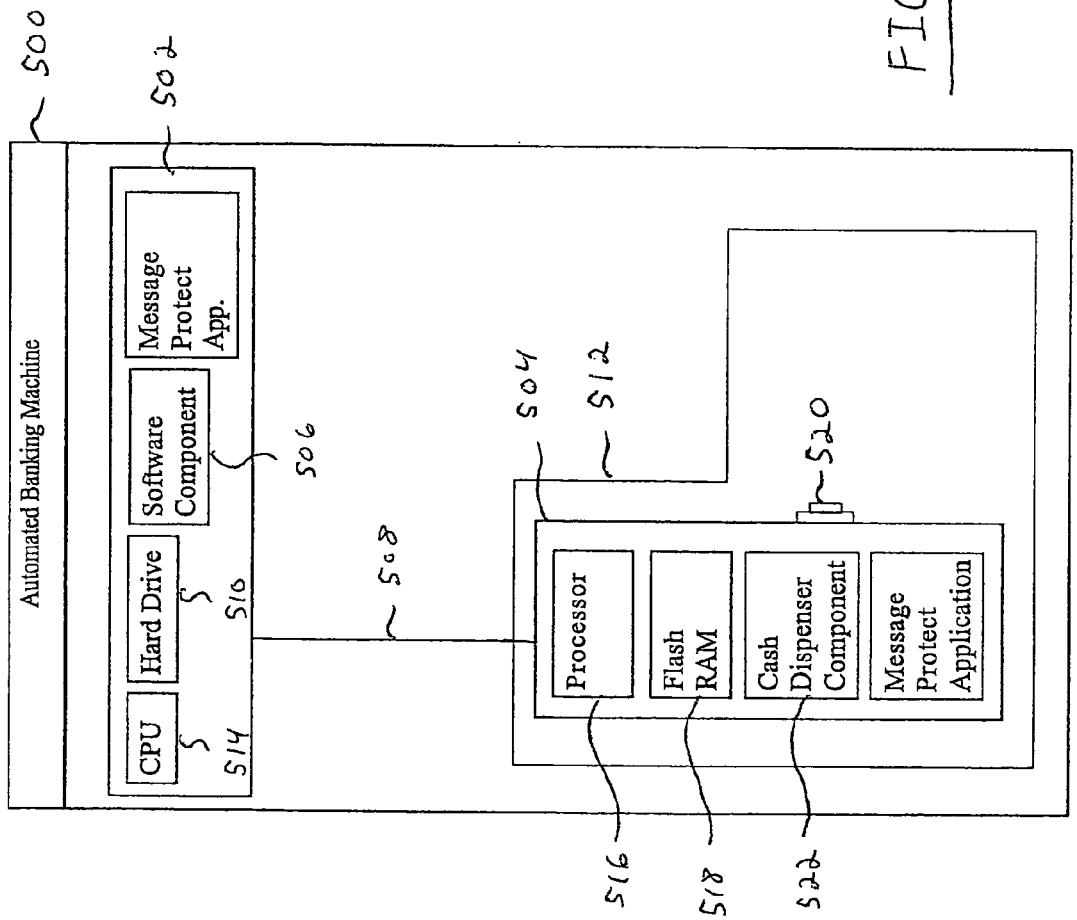
FIG. 5 shows an exemplary embodiment of an automated banking machine with a software component of a computer that is operative to establish a secure communication session with a cash dispenser.

FIG. 5, shows an example of a system which uses more than one identity data such as a serial number to authenticate components and establish a secure communication session between the components. In this example one component corresponds to a software component 506 operating in a computer 502 of an ATM 500 and the other component corresponds to a hardware device such as a cash dispenser 504 of the ATM. In this example, the computer 502 of the ATM 500 may be located outside a secure chest or safe 512 of the ATM. The ATM may further include all or portions of the cash dispenser 504 located within the safe 512.

The computer may include at least one processor 514 and at least one hard drive 510 or other non volatile replaceable memory. A software component 506 such as a device driver, service provider, or other device interfacing program may be stored on the hard drive and execute in the processor of the computer. The processor may be associated with a unique processor identification number or serial number (SN1). Also the hard drive may be associated with a unique hard drive identification number or serial number (SN2). Each of these serial numbers may be retrievable by the software component 506.

The cash dispenser may include: a processor 516; a data store 518 such as a flash RAM or other nonvolatile memory; and a software or firmware cash dispenser component 522 that operates in the processor 516 of the cash dispenser.

In an exemplary embodiment of the ATM, the cash dispenser may be connected to the computer through a communication path 508. The communication path may correspond to a USB cable or other serial, network, or other communication line which is operative to transport data between the cash dispenser and the computer.

The cash dispenser may include a public/private key pair stored in the data store of the cash dispenser. In an exemplary embodiment the cash dispenser component 522 may be operative to generate the public/private key pair and store the keys in the data store 518. In alternative exemplary embodiments, the cash dispenser may be manufactured to include a unique public/private key pair in the data store.

In an exemplary embodiment, the cash dispenser may include an input device 520 such as a button which is located within the safe 512. Such an input device may only be accessed by a user by unlocking and opening a door to the safe. The cash dispenser may be responsive to the input device being activated by a user to accept updates of one or more serial numbers sent to the cash dispenser from software operating in the computer 502 of the ATM. In this described exemplary embodiment, the serial numbers sent by the computer and accepted by the cash dispenser in response to a button 520 being pressed, may include the unique serial numbers (SN1, SN2) of the processor and hard drive of the computer. However, it is to be understood that in alternative exemplary embodiment, other serial numbers may be used. The cash dispenser may be operative to store the received serial numbers in the data store 518 of the cash dispenser.

In the described exemplary embodiment, the cash dispenser may be operative to determine if the button 520 is pressed. If the button is not pressed at the time the serial numbers are sent to the cash dispenser, the cash dispenser may reject or otherwise discard the received serial numbers. In alternative exemplary embodiments the cash dispenser in response to the button being pressed may send a message to the computer which causes the computer to send the serial numbers to the cash dispenser for shortage in the cash dispenser.

Figure 6:
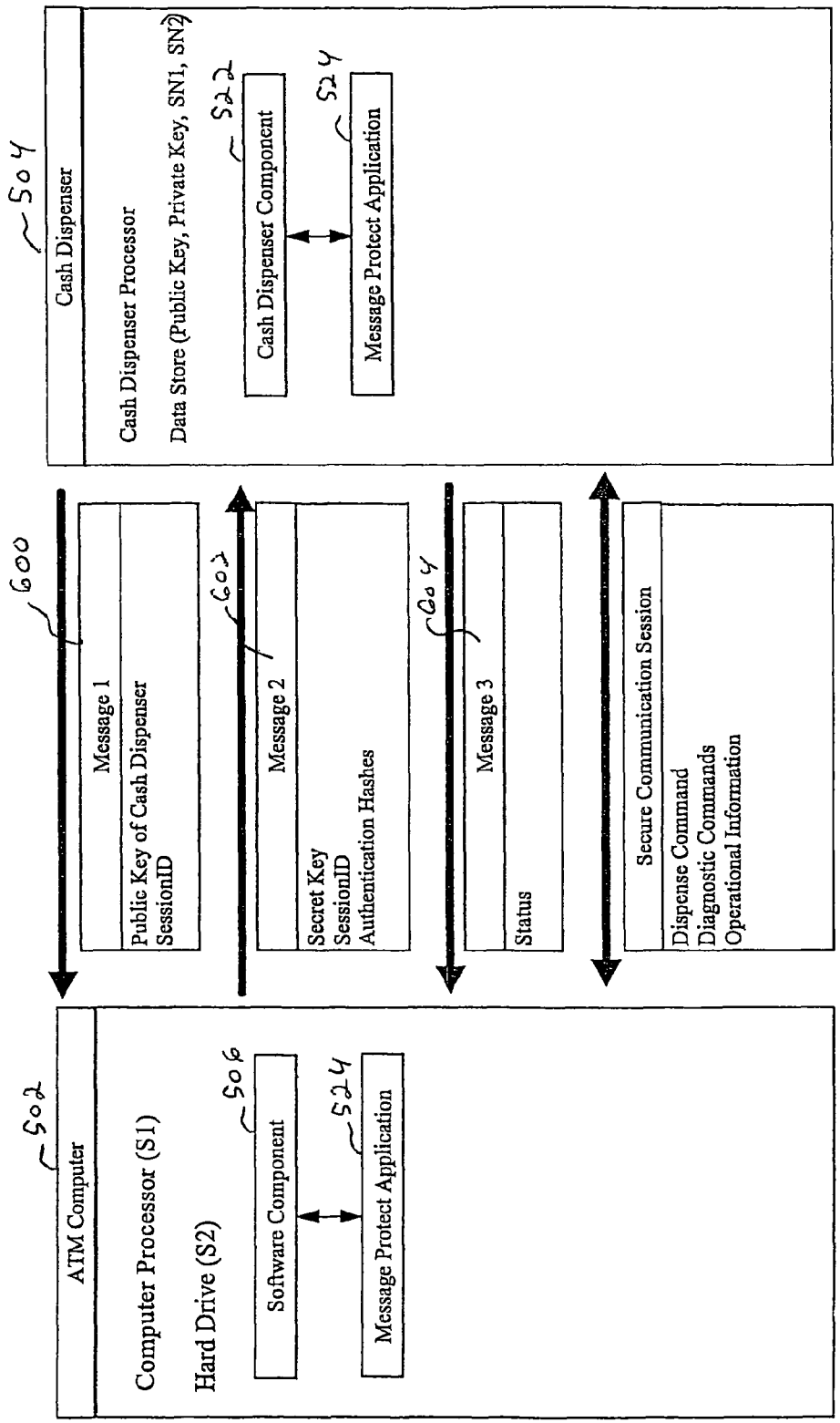
FIG. 6 shows an schematic view of an automated banking machine with a software component of a computer that is operative to establish a secure communication session with a cash dispenser.

FIG. 6, shows a schematic view of the system. Here both the software component 506 and the cash dispenser component 522 may be operative to access a message protect application 524. In this described exemplary embodiment, each of the processors in the computer and the cash dispenser may execute individual instances of the message protect application 524.

The message protect application 524 may include one or more functions which are callable by the software component and cash dispenser component to perform the cryptographic calculations that are involved in an exemplary method for establishing a secure communication session between the components.

Prior to forming a secure communication session between the software component 506 and the cash dispenser component 522, each is operative to access the serial numbers (SN1, SN2) associated with the computer. In this described exemplary embodiment, the software component 506 of the computer may be operative to retrieve the serial numbers from the local hardware devices (i.e. the processor and hard drive). The cash dispenser component 522 may be operative to retrieve the serial numbers from the data store 518.

When establishing a connection, the software component 506 and the cash dispenser component may send their corresponding message protect applications the required data needed to generate the messages used to establish a secure communication session between the components.

For example in the described exemplary embodiment shown in FIG. 6, the cash dispenser component is operative to generate and send a first message 600 to the software component. The first message may include the public key associated with the cash dispenser and a new SessionID generated by the cash dispenser component. A different SessionID may be uniquely generated for each initial attempt to establish a secure communication session with another component.

In response to receiving the first message, the software component 506 is operative through calls to the message protect application 524 to generate a second message. As discussed previously the software component may be operative to have a secret key randomly generated. Also as discussed previously the software component may be operative to have the secret key encrypted with the public key received in the first message.

In the previously described method the software component was further operative to have the identity data associated with the software component hashed with the public key. In this described exemplary embodiment, there may be more than one identity data. For example, the software component may be operative to retrieve two identity data values or serial numbers (SN1, SN2) associated with the computer. The software component may pass these two serial numbers (SN1, SN2) to the message protect application. The message protect application may be operative to generate a plurality of hashes using data that may include the two serial numbers (SN1, SN2), the public key (PublicKey) of the cash dispenser, and a further default serial number (DefaultSN). Different combination of this provided data may be hashed together using a one way hash algorithm such as MD5 for example to produce the plurality of authentication hashes. In an exemplary embodiment the following Equations show example formulas for generating three authentication hashes:

$$Hash1 = MD5(SN1+SN2+PublicKey) \quad (1)$$

$$Hash2 = MD5(SN1+DefaultSN+PublicKey) \quad (2)$$

$$Hash3 = MD5(DefaultSN+SN2+Public Key) \quad (3)$$

In these described equations, the arguments of the MD5 algorithm are shown as being concatenated together. However, it is to be understood that in alternative exemplary embodiments, the arguments shown may correspond to parameters to a further algorithm which is operative to combine the arguments in a different manner prior to performing the MD5 function.

In the exemplary embodiment, the second message generated by the software includes the encrypted secret key, the three authentication hashes and a copy of the SessionID received in the first message. To enable the information in the second message to be private and confidential, the three authentication hashes and/or the SessionID may further be encrypted using the secret key. In alternative exemplary embodiments a combination of the secret key, authentication hashes and/or the SessionID may be encrypted using the public key of the cash dispenser.

After the second message has been generated it is sent to the cash dispenser. The cash dispenser component may through calls to its message protect application 524 decrypt the information in the second message and authenticate the second message.

For example, the cash dispenser component may retrieve the stored serial numbers (SN1 and SN2) and the public key and the private key of the cash dispenser from the data store of the cash dispenser. The serial numbers, public key, private key, and the second message may be passed to the message protect application. The original SessionID may also be passed to the message protect application. The message protect application may be operative to use the private key to decrypt the secret key in the second message. The message protect application may further use the secret key to decrypt the authentication hashes and/or the SessionID in the second message.

To verify that the second message was generated in response to the first message, the message protect application may be operative to verify that the original SessionID sent in the first message corresponds to the SessionID received in the second message. If the SessionIDs do not match the message protect application may be operative to indicate to the cash dispenser component that the handshaking between the components has failed to produce a secure commendation session.

To verify that the second message originated from a trusted software application in the computer of the ATM, the message protect application may be operative to generate three further authentication hashes using the previously described Equations 1-3. These three further authentication hashes may be generated using the serial numbers (SN1, SN2) stored in the data store of the cash dispenser, the defaultSN, and the public key of the cash dispenser.

In an exemplary embodiment, the defaultSN may correspond to a value that is known or available for use by both message protect applications each executed by the computer and the cash dispenser. Such a defaultSN may equal "1234567890", "ABCDEFGHIJ" or some other known or fixed value. In this described exemplary embodiment, when the serial numbers used to form the authentication hashes in the second message correspond to the serial numbers known to the cash dispenser, all of the authentication hashes in the second message will match the further authentication hashes generated by the cash dispenser. In this case, the message protect application may be operative to indicate to the cash dispenser component that a secure communication session has been formed and that the session may be fully trusted.

If all of the authentication hashes in the second message do not match the further authentication hashes generated by the cash dispenser, then the message protect application may be operative to indicate to the cash dispenser component that a secure communication session has not been established. If one but not all of the authentication hashes in the second message match the further authentication hashes generated by the cash dispenser, then the message protect application may be operative to indicate to the cash dispenser component that a secure communication session has been established but may only be partially trusted or trusted at one of a plurality of different trusted levels. In alternative exemplary embodiments, based on which hashes fail to be identical, the message protect application may indicate to the cash dispenser component which of the serial numbers did and/or did not match.

The cash dispenser component may perform all, none or a limited subset of operations requested by the software component in response to an indication that the secure communication session is only partially trusted. For example, if one but not both of the processor and hard drive on the computer or other components associated with the serial numbers (SN1, SN2) are replaced by a technician servicing the ATM, one of the two serial numbers used by the software component to generate the second message will be different than the corresponding serial number stored by the cash dispenser. In this case, a secure communication session may be formed which is only partially trusted. When at least one of the serial numbers remains the same, the cash dispenser may be adapted to continue to operate to dispense cash in response to commands received from the software component. Also, when only one of the serial numbers remains the same, the cash dispenser may be adapted to have reduced functionality which limits the functionality of the cash dispenser for example to only performing servicing and diagnostic functions in response to commands received from the software component. In further exemplary embodiments, the cash dispenser may be adapted to not establish and use the secure communication channel when at least one of the serial numbers is not valid.

In the exemplary embodiment, the cash dispenser component is operative to generate a third message 604 which is sent back to the software component. The third message may include status data representative of the trust level determined by the cash dispenser component so that the software component will be operative to determine what commands the cash dispenser will accept. For example, if the status data indicates that the secure communication session is fully trusted, then the software component may be operative to send encrypted messages through the secure communication session which request the cash dispenser to dispense cash for example. If the software component corresponds to a device driver for example, the software component may then return a message to a calling program which indicates that the cash dispenser is ready to receive commands to dispense cash or perform other operations.

If the status data indicates that no secure communication session has been established, then the software component can propagate an error message to the calling program and/or an error log which indicates that the cash dispenser is not ready to receive commands. The error message may be generated in response to the status data and may indicate the reason for the error. Such reasons may include a failure to verify the serial numbers of the processor or hard drive for example. Such reasons may also indicate that an invalid SessionID has been detected As described previously, once a secure communication session has been established, the two components (i.e. the software component and the cash dispenser component) may proceed to use the transferred secret key to encrypt and decrypt messages sent between them. In an exemplary embodiment, to further increase the security of the communications, each time a message is to be encrypted and passed between the two components, the two components may individually calculate new secret key hashes based on the original secret key transferred between the components. Each new secret key hash generated may only be used to encrypt and decrypt a single message. For the next message and each subsequent message, new modified secret key hashes (i.e. nonce) may be generated by the software component and the cash dispenser. Because the new secret key hashes are derived from the original transferred secret key, both the software component and the cash dispenser component are operative to generate the same sequence of new secret key hashes for each new message and as a result may continue to encrypt and decrypt the new messages sent between them.

For example, in an exemplary embodiment once the secure communication session has been established, future communications may use MD5 and the Advanced Encryption Standard (AES) cryptographic algorithm along with different secret key hashes to ensure communications are not duplicatable. In an exemplary embodiment, the secure communications may be comprised of two parts: a message header and encrypted message data. The message header may include a message authentication code (MAC) for the message data. Such a MAC may be generated by creating a first message digest of the message data. In an exemplary embodiment a first message digest may be formed by hashing the message data with a secret key hash using a one-way hashing function such as MD5. Further, a second message digest may be generated by hashing the first message digest with the secret key hash. In this described exemplary embodiment the resulting second message digest may correspond to the message header.

The encrypted message data may be formed by passing the message data and the secret key hash through a symmetrical encryption algorithm such as AES. The messages communicated between components such as the computer and the cash dispenser may then include the combination of the generated message header and the encrypted message data.

The component receiving the message may be operative to decrypt the message data using a secret key hash derived from the original transferred secret key. To authenticate the message, the receiving component may also generate a MAC from the message data which may then be compared to the message header.

As discussed previously, the secret key hash may be modified with each newly sent and received encrypted message. Thus for the next message sent between the two components, a new secret key hash may be used which is generated by incrementing the previously secret key hash with a known value. In exemplary embodiments, different sets of new secret key hashes may be generated for both sending and receiving by the components.

In the previously described exemplary embodiments, the authentication hashes are generated by hashing one or more identity data values such as serial numbers with a public key of a component. The same public key may also be used to encrypt the uniquely generated secret key. However, in alternative exemplary embodiments, the identity data values such as serial numbers may be hashed with another public key or other shared hashing argument (HashingArg) which is different than the public key used to encrypt the uniquely generated secret key. In such an alternative exemplary embodiment, the component initiating the secure communication session may generate a first message 600 which includes the public key for use in encrypting the secret key, the unique SessionID, and a further hashing argument which is used in place of the public key in the previously described Equations (1-3). The corresponding equations used for generating the authentication hashes may be as follows:

$$Hash1 = MD5(SN1 + SN2 + HashingArg) \quad (4)$$

$$Hash2 = MD5(SN1 + DefaultSN + HashingArg) \quad (5)$$

$$Hash3 = MD5(DefaultSN + SN2 + HashingArg) \quad (6)$$

In further alternative exemplary embodiment, the unique sessionID may be used for the hashing argument in place of the public key. As a result the equations for generating the authentication hashes may be as follows:

$$Hash1 = MD5(SN1 + SN2 + SessionID) \quad (7)$$

$$Hash2 = MD5(SN1 + DefaultSN + SessionID) \quad (8)$$

$$Hash3 = MD5(DefaultSN + SN2 + SessionID) \quad (9)$$

In this described exemplary embodiment, the SessionID may not be included in the message which sends the encrypted secret key and the authentication hashes. Rather the further authentication hashes may be generated using the original sessionID. As a result, the received authentication hashes and the further authentication hashes generated will only match when the same sessionID was used to generate both sets of authentication hashes.

The described exemplary embodiment shows a cash dispenser of an ATM that is operative to establish a secure communication channel with a software component of the computer of an ATM. However, it is to be understood, that in alternative exemplary embodiments, that other software and hardware components in the ATM be use the same methods to establish a secure communication session between them. For example in alternative exemplary embodiments, software components such as device drivers may be operative to perform the above described methods to established a secure communication session with a cash recycler, depository, or other devices in the ATM. Further the described methods may be used to establish a secure communication session between a host banking system or other remote system and an ATM.

It is to be understood that the previously described exemplary embodiments of methods for establishing secure communication session between components may or may not use dedicated cryptography hardware or chips such as a TPM to perform cryptographic calculations. Cryptographic calculations for example may be performed using software programs such as the message protect application running in the processor of the computer and hardware devices.

However, as discussed previously, alternative exemplary embodiments of an automated banking machine may use cryptographic hardware such as a TPM to establish secure communications between components using all or portions of the previously described methods. In additional alternative exemplary embodiments of an automated banking machine with a TPM may include different methods for establishing secure communications and trust between components than previously discussed.

Figure 7:
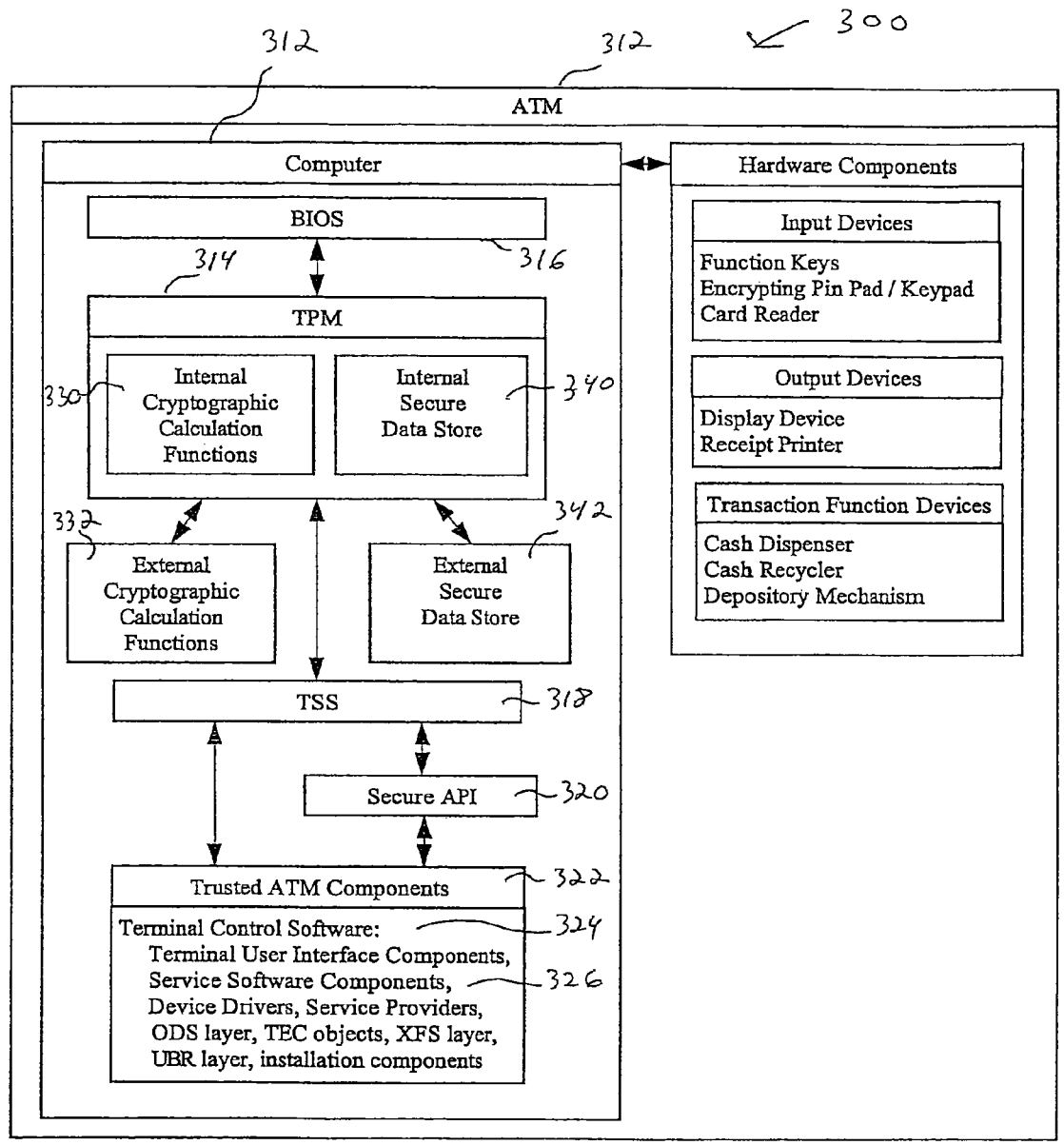
FIGS. 7-9 show schematic views of an automated banking machine that includes a trusted platform with a trusted platform module.

For example, an alternative exemplary embodiment of an ATM may include a trusted platform (TP) which may also be referred to as a trusted computing platform or a trusted computer base (TCB). FIG. 7 shows an exemplary embodiment of a trusted platform (TP) 300 for an ATM 310. The ATM 310 may include a computer 312. The computer 312 may include a motherboard with a BIOS 316. The computer 312 may further include a trusted platform module (TPM) 314 that complies with a trusted platform specification such as the Trusted Computing Platform Alliance (TCPA) specification, Trusted Computing Group (TCA) specification, Microsoft next-generation secure computing base (NGSCB) (formerly called Palladium), Intel LaGrande Technology or other TP specification for establishing a trusted and secure computing environment.

In exemplary embodiments, the TPM may be comprised of one or more computer chips integrated into the motherboard of the computer 312 or otherwise placed in operative connection with a computer processor of the ATM. An example of a TPM which may be used with exemplary embodiments of an ATM includes a TPM SLD 9630 chip of Infineon Technologies AG which is based on the TCPA Main Specification version 1.1b. In other exemplary embodiments the ATM may include a TPM which corresponds to other specifications for a TPM such as the Trusted Computer Group TPM 1.2 Specification or later developed specifications.

Also, in exemplary embodiments, the TPM may correspond to Microsoft's specification for a security support component (SSC) for the Microsoft NGSCB. In alternative exemplary embodiments the TPM may also be incorporated into the processor of the computer of the ATM, hardware card, or other device in operative connection with the computer processor of the ATM.

As used herein a TP corresponds to hardware and software components of a computer that conform to a trusted platform specification such as Microsoft's NGSCB, the TCPA Main Specification version 1.1b, the TPM 1.2 specification, Intel's LaGrande Technology Specification or another trusted platform which uses a TPM.

As used herein the TP may be described as being used to perform functions which may require the use of a TPM. However, it is to be understood that in addition to the TPM, software associated with the TPM may also be involved in the performance of functions for the TP. Such software many include a trusted portion or kernel of the operating system such as a nexus in Microsoft's NGSCB specification. Such software may further include a trusted application, nexus computing agent (NCA), protected applet, application programming interface (API), software stack, or other software component that enables the TP to perform the described function. As used herein and in the claims, references to using a TP to perform a particular cryptographic calculation, authentication, or other function may include the use of the TPM chip and/or other software or hardware components which comprise the TP such as a nexus or NCA.

The ATM 310 shown in FIG. 7 includes a TP 300 that conforms to the TCPA Main Specification version 1.1b. Here the TP of the ATM 310 may include a TPCA Software Stack (TSS) 318 or other library which may provide modules and components that provide the supporting functionality to the TPM.

The ATM 310 may further include a secure API 320 which provides a set of functions that ATM software 322 may use to configure and communicate with the TPM through the TSS. In an exemplary embodiment the secure API may include functions for accessing on-chip cryptographic hardware functions 330 of the TPM such as encryption, decryption hashing, and key generation. Examples of on-chip encryption and decryption functions that may be accessed through the secure API may include RSA, DES, and Triple DES for example. In the exemplary embodiment the terminal control software 324 may perform encryption and decryption operations involved with the performance of transactions for consumers using the on-chip functions of the TPM. In alternative exemplary embodiments the ATM software may be operative to communicate with the TPM through direct access to the functions of the TSS. In further alternative exemplary embodiments, the ATM software may be operative to communicate with the TPM through a Microsoft cryptography API (CAPI) included with a Microsoft operating system installed in the ATM for example.

Figure 8:
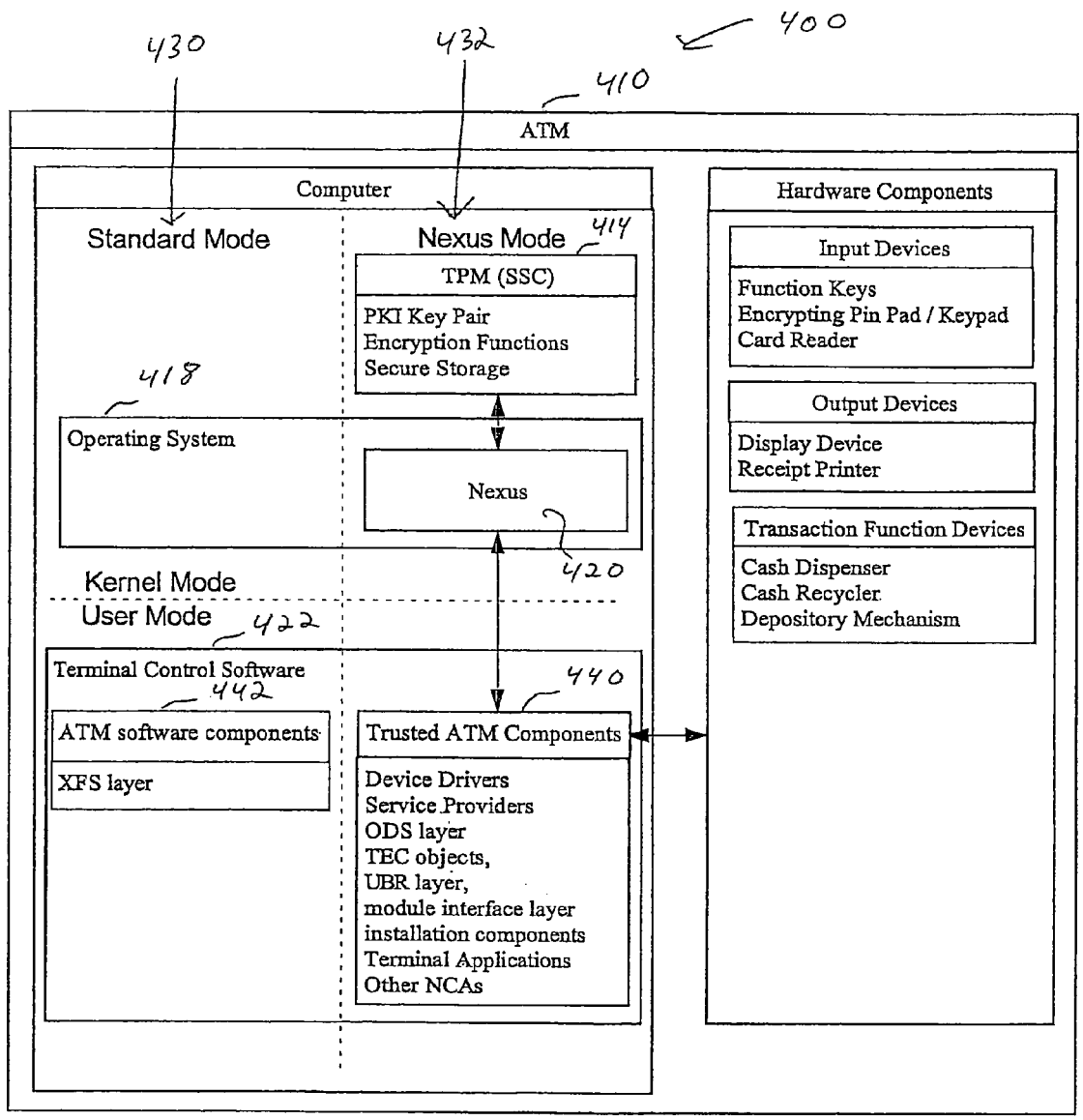

FIG. 8 shows an exemplary embodiment of a TP 400 for an ATM 410 which conforms to the Microsoft's. NGSCB specification. Here the TPM chip 414 may correspond to or may be referred to as a security support component (SSC). Also, with this specification the software which interfaces with the TPM chip may include the NGSCB nexus 420 or other secure kernel or component of an operating system 418. An ATM with a NGSCB trusted computing platform may include two modes of operation referred to as the standard mode or left hand side 430 and the nexus mode or right hand side 432. Both modes may be operative at the same time on a computer of the ATM. Legacy applications which are not designed for use with a TPM 414 may execute in the standard mode of the platform. However, trusted applications which are designed to use features of the TPM may be granted permission to operate in the nexus mode 432. Such trusted applications include the NGSCB nexus 420, nexus computing agents (NCAs), and/or other software components which are adapted to operate in the nexus mode.

In an exemplary embodiment of the ATM 410, at least one of the terminal control software components 422 of the ATM may be granted permission to operate in the nexus mode. In a TP based on Microsoft's NGSCB specification such components may be programmed to use features of the TPM through communication with the nexus 420. As used herein, terminal control software components which interface with a TPM and/or which operate in the nexus mode are referred to as trusted ATM components 440. In a TP based on Microsoft's NGSCB such trusted ATM components may correspond to NCAs for example.

Figure 9:
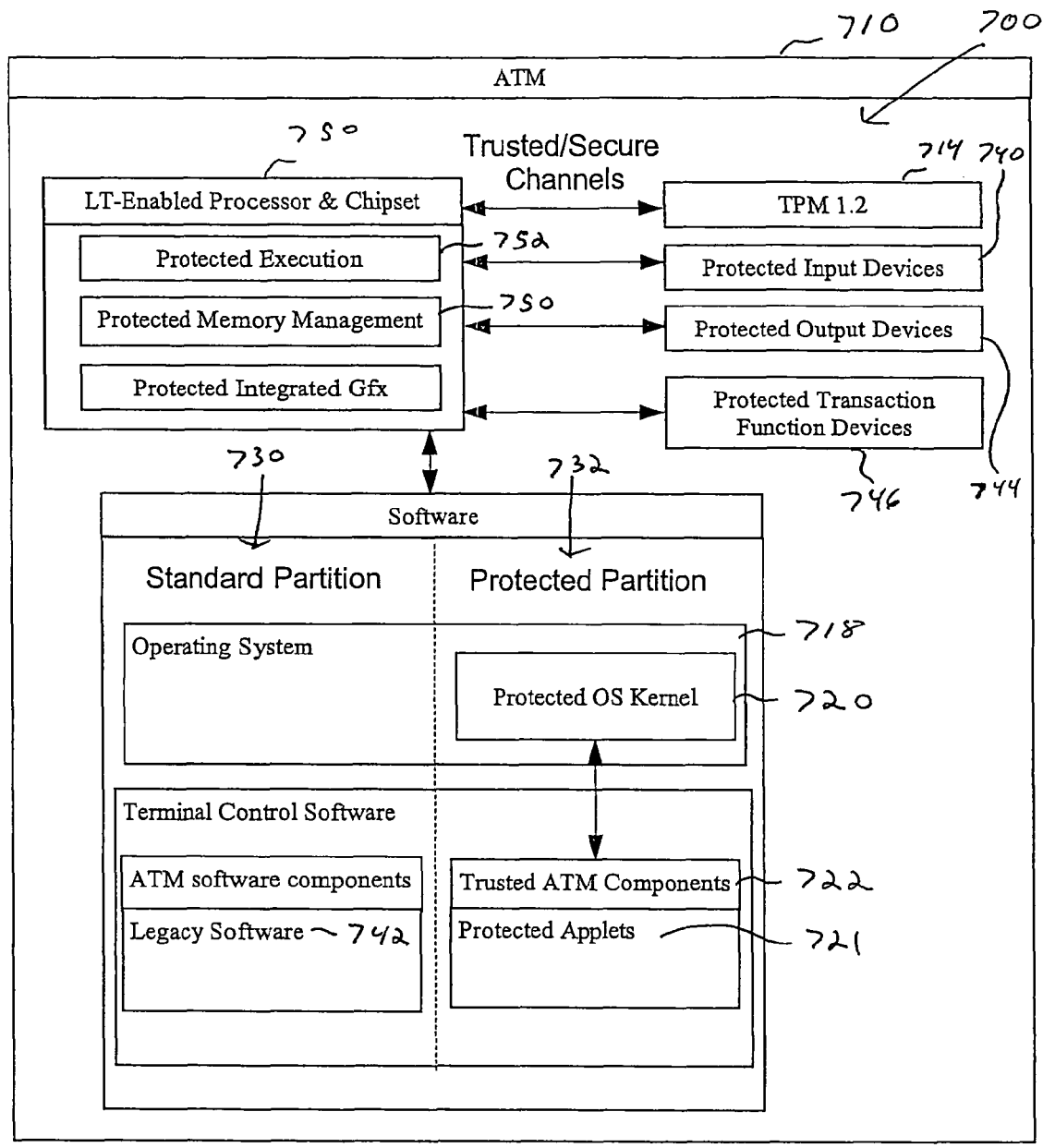

FIG. 9 shows an exemplary embodiment of a TP 700 for an ATM 710 which conforms to the Intel LaGrande Technology (LT) specification. Here the TPM 714 may correspond to one or more chips integrated with a motherboard of the computer of the ATM. In other exemplary embodiments, the TPM may be integrated into the computer processor of the ATM. In exemplary embodiments the TPM may correspond to the TPM 1.2 specification released by the Trusted Computing Group.

In the LT specification, the software which interfaces with the TPM chip may correspond to the NGSCB nexus or other secure or protected kernel 720 or component of an operating system 718. As with the previously described NGSCB TP, the LT TP may include two modes of operation referred to in the LT specification as the standard partition or public area 730 and the protected partition or vault 732. Both modes may be operative at the same time on a computer of the ATM. Legacy applications 742 which are not designed for use with the TPM 714 may execute in the standard partition of the platform. However, trusted applications which are designed to use the TPM may be granted permission to operate in the protected partition 732. Such trusted applications may include a protected kernel 720 such as the NGSCB nexus and, protected applets 721 and/or other software components which are adapted to operate in the protected partition.

In an exemplary embodiment of the ATM 710, at least one of the terminal control software components 722 of the ATM may be granted permission to operate in the protected partision 732. In a TP based on Intel's LT specification such components may be programmed to use features of the TP 700 through communication with the protected kernel 720. As used herein, terminal control software components which operate in the protected partition defined by the LT specification are also referred to as trusted ATM components 722 and may correspond to protected applets 721.

Examples of trusted ATM components which are operative in the nexus mode or protected partition of the TP may include components which communicate financial information such as account data to a remote host banking system. Other examples of trusted ATM components may include service providers, device drivers, or other portions of the device interface layer of the ATM which communicate with input devices, output devices, and transaction function devices such as a cash dispenser, cash recycler, or depository mechanism. In addition trusted ATM components may include the terminal applications and/or configuration components for use with servicing, installing, maintaining or configuring the ATM. Further, trusted ATM components may include software for generating a user interface usable by a customer to cause the ATM to perform financial transactions and functions such as the dispense of cash.

Although, in an exemplary embodiment of the ATM, all of the terminal control software may be programmed to operate in the nexus mode, in other exemplary embodiments, one or more of the terminal control software components may continue to operate in the standard mode 430 (FIG. 8) or standard partition 730 (FIG. 9) of the computer of the ATM. For example, legacy ATM software components 442, 742 such as a WOSA/XFS (Windows Open Services Architecture/eXtensions for Financial Services) manager or other XFS layer or other device interface layer may continue to operate in the standard mode or partition. However, other components, such as software components which have access to secure financial information, items of value (i.e. cash, deposits) for example may operate on the nexus mode or protected partition of the TP.

In exemplary embodiments, trusted ATM components may use one or more of the following mechanisms of one or more of the previously described TP specifications: curtained execution, sealed storage, secure I/O, and attestation. With curtained execution, a trusted ATM component is isolated from software that is not trusted by the trusted ATM component. With sealed storage, the trusted ATM component has access to secret information stored in the sealed storage in a data store of the ATM which is not available to other software unless the other software is trusted by the trusted ATM component. With attestation, the trusted ATM component has access to an authentication mechanism which enables the component to prove its identity to other software components located on the ATM or remote from the ATM. With secure I/O, the trusted ATM component is operative to receive secure inputs or send secure outputs through secure or protected input and output devices of the ATM.

With respect to curtained execution, exemplary embodiments of the computer processor, associated chipsets 750 of the computer motherboard, TPM, and/or protected kernel of the TP may include protected memory management 750 and protected software execution 752 as defined by the TP specification of the TP of the ATM. Such protected memory management and protected software execution may place software process and other data stored in memory and executing in the processor, in an encrypted, isolated, and/or protected form to prevent unauthorized rogue components such as a virus or worm from acquiring information about software processes and associated data from the processor and memory of the ATM.

With respect to sealed storage, the exemplary embodiment of the TP may be used to manage the storage of secret information in one or more data stores of the ATM. Such sealed storage may include an internal data store 340 such as a nonvolatile RAM located on the TPM. Such sealed storage may also include a data store 342 which is external to the TPM such as an encrypted file on a hard drive. Information stored in the sealed storage may be encrypted by the TP using public keys and an RSA cryptography algorithm and/or symmetric keys using a symmetric cryptography algorithm.

In exemplary embodiments, information used by an ATM such as secret keys, signature keys, verification keys, encipherment keys, decipherment keys, private keys, public keys, and authorization keys or other critical information used in the operation of the ATM may be securely stored in the ATM in the sealed storage through use of the TP. For example, secret keys used by an encrypting pin pad (EPP) may be stored in an internal or external data store managed through use of the TP. Also private keys used for creating digital signatures for the ATM may be securely stored using the TP. The ATM may use the TP to sign messages using the private keys stored by the TPM. Examples of other information that may be securely stored in sealed storage of the ATM using the TP may include transaction information and information regulated by government or industry such as anti-fraud mechanism information for areas such as bulk note tables, canister mappings, account access, transaction journals, and repudiation.

In an exemplary embodiment, a trusted ATM component may through use of the sealed storage features of the TP cause information to be stored in an encrypted form in a sealed storage in a data store of the ATM using a key associated with the trusted ATM component. Such a trusted ATM component may correspond to the owner of the information. The exemplary embodiment of the TP may enable the owner trusted ATM component to use the TP to retrieve and return the information stored in the sealed storage back to the owner trusted ATM component. The owner trusted ATM component, may also selectively grant permission to another trusted ATM component to access through use of the TP, the information stored in the sealed storage by the owner trusted ATM component.

With respect to secure I/O, the TP may be adapted to securely communicate with one or more protected input 740 and output devices 744. In exemplary embodiments, the computer of the ATM may include a trusted keyboard controller or other trusted input device controller adapted for use with a TP. The trusted input device controller may be operative to form a trusted secure communication channel with the one or more protected input devices through which communications can be securely transmitted to a trusted ATM component. The secure communications may be encrypted for example such that unauthorized software operating on the ATM cannot determine the unencrypted form of the information being inputted through from the protected input device. In exemplary embodiments the trusted ATM components are operative responsive to the secure communications received from a protected input device to cause transaction functions devices to operate. For example with a protected touch screen or key pad input device for example, communications between a trusted ATM component and the touch screen or keypad may be encrypted such that a virus, worm or other unauthorized component operating in the computer of the ATM would be unable to acquire private information from the touch screen or keypad such as a user's PIN or other information. Further with a protected card reader for example, communications between a trusted ATM component and the card reader may be encrypted such that an unauthorized component operating in the computer of the ATM would be unable to acquire private information read from a card with the card reader such as an account number.

In addition one or more of a video graphics controller, receipt printer, statement printer, passbook printer, or other output device of the ATM may correspond to protected output devices 744. For example, the ATM may include a protected video graphics controller that is adapted for use with a TP. Secure communication between the computer processor of the ATM and the protected video graphics controller may be encrypted such that a virus, worm or other unauthorized software would be unable to acquire private information sent to the video graphics controller or video memory such as the display of account information.

In addition to protected input and output devices, other devices of the ATM such as transaction function devices 746 may also be adapted for use with a TP. For example the TP may be used to establish a secure communication channel between a trusted ATM component and one or more transaction function devices such as a cash dispenser. The trusted ATM components and transaction function devices may be operative to send one or more encrypted messages through the secure communication channel which causes the transaction function devices to operate and/or which communicates data between the transaction functions devices and the trusted ATM components. Examples of such messages may include command messages and status messages. In an exemplary embodiment a device controller such as a USB controller or other hardware controller of the computer of the ATM may be adapted for use with a TP to establish the secure communication channel between the computer and the transaction function devices connected to the controller.

The TP may be used to provide sealed storage for symmetric and asymmetric keys and other protected information used by the trusted ATM components. The TP may also be used to perform cryptographic processes such as asymmetric and symmetric encryption and decryption for trusted ATM components. The TP may also be used to perform key generation, public/private key pair generation, random number generation, hash generation, digital signature generation, and digital signature verification for trusted ATM components. In addition The TP may be used to provide a report or attestation to the current configuration of the ATM or other information. For example, the TP may be used in acquiring and/or verifying information about trusted ATM components and hardware device installed on the ATM.

With respect to attestation, the information acquired about a component of the ATM for attestation using the TP is referred to herein as a measurement of the component. Such a measurement may take place when the ATM is initially booted or at other times during the operation of the ATM. The measurements may be securely stored using the TP and used later to determine if the configuration of the ATM has changed.

In an exemplary embodiment, a trusted ATM component and/or an external system remote from the ATM such as a host banking system may be operative to verify the information about the measured components of the ATM. The exemplary embodiment of the TP may be used to attest to the information about the measured component by digitally signing the measurement of the component with a private key of the TPM. The digitally signed measurement or hash may be sent to the software application, device, and/or external system which requested information about the measured component and/or a measured configuration of the machine.

In the exemplary embodiment the TPM may include at least one private key securely stored in the TPM chip. The TPM may further include at least one digital certificate that includes the public key which corresponds to the private key stored in the TPM. Such a digital certificate may be signed by the motherboard or TPM manufacturer for example.

The TPM may also be operative to store additional public and private keys and corresponding digital certificates. The additional digital certificates associated with the TPM may be signed by a certificate authority which enables them to be verified by authenticating the signature of the certificate authority. In exemplary embodiments, the TPM may be operative to provide a root of trust for the ATM through a PKI infrastructure. The TPM may be operative to extend its trust to one or more components of the ATM, such as a nexus and trusted ATM components, by building a chain of trust. Also trusted ATM components may be operative to extend their trust to other components.

In exemplary embodiments, the TP of the ATM may be used to enable the computer of the ATM to boot into a known state with hardware and software that is verified through use of the TPM. In this described exemplary embodiment, the ATM software 322 such as the terminal control software may include trusted ATM components that are operative to audit the configuration of the ATM. Such auditing ATM components may through use of the TP acquire measurements for a plurality of the software and/or hardware components of the ATM. The results of the measurements may be compared to know authorized configurations of valid measurements of the components. In an exemplary embodiment such authorized configurations may be digitally signed to prevent undetected unauthorized modifications to the authorized configurations.

In alternative exemplary embodiments, the authorized configurations may be stored in a data store managed by a remote system such as a server associated with a host banking system. Prior to authorizing the ATM to perform transaction functions or at startup, the host banking system may communicate with the ATM to direct that the trusted ATM components acquire measurements of one or more devices of the ATM. The measurements may be returned to the host banking system for verification against the known authorized configurations for the ATM. If the measurements do not correspond to valid measurements of one or more authorized configurations for the ATM, the host banking system may be operative to prevent the ATM from performing transactions.

In the exemplary embodiment, the TP may be used to measure components as soon as the ATM is booted. If the hardware and/or software components are not successfully verified, the TP may be operatively configured to prevent the computer of the ATM from booting into a fully functional state. For example, the TPM may be operative to verify that the BIOS of the computer motherboard has not been altered. The TPM may be operative to measure the nexus or other kernel of an operating system before enabling the nexus or other protected kernel of an operating system to execute. For example, the measurement may include loading a nexus into secured curtained memory and sending an image of the memory to the TPM chip. The TPM chip may make a cryptographic hash of the image. When the nexus is first started, this hash may be permanently stored in the TPM chip. On subsequent boots of the ATM, the TPM chip may be operative to measure the current nexus and verify that the hash of the nexus matches the hash originally stored in the TPM chip.

In exemplary embodiments, the TP may also be used to measure hardware configurations and hardware devices to verify that the ATM includes the correct hardware. The TP may also be used to measure the installed software of the ATM such as the operating system and other specified software to assure that the installation of the ATM has not had an unauthorized change. The software being verified may include both trusted ATM components and other software components and applications which may not run on the nexus mode of the TP.

Automated banking machines such as an ATM may be operative to perform cryptographic calculations involved with securely sending and receiving an ATM terminal master key, ATM communication keys, and user entered PINs or other information between the ATM and an ATM host banking system. Examples of ATM systems which use cryptographic calculations and protocols to securely transfer keys between an encrypted pin pad of an ATM and a host banking system and which may be adapted to use a TP are shown in U.S. application Ser. No. 10/126,140 filed Apr. 19, 2002 which is incorporated herein by reference in its entirety. In an exemplary embodiment of the ATM, one or more cryptographic calculations required by the EPP described in application Ser. No. 10/126,140 may be performed using the on-chip or off-chip cryptographic functions of the TP.

For example, in an exemplary embodiment, a service technician may initiate a function at the ATM or from a remote location which causes a trusted ATM component to send a request to a host banking system for a terminal master key. The request may include a digital certificate associated with the TP and/or the trusted ATM component. The host banking system may validate the certificate and use the public key associated with the certificate to encrypt a terminal master key. The host banking system may then send a message to the ATM which includes the encrypted terminal master key. Once the message is received, the trusted ATM component may be used to decrypt the encrypted terminal master key using a corresponding private key and an asymmetric cryptography algorithm such as RSA.

The message from the host banking system with the encrypted terminal master key may be digitally signed by the host banking system. The trusted ATM component may validate the terminal master key through verification of the digital signature. In an exemplary embodiment, the unencrypted terminal master key may be securely transferred to an encrypted pin pad for use with decrypting symmetrical communication keys provided to the EPP by the host banking system.

As a further verification, the ATM may output a hash of the public key of the host system which was used to validate the signature of the host banking system. The ATM may require a technician to provide an input to the ATM which is representative of a confirmation that the hash of the public key of the host banking system is valid. In addition the public key of the host banking system may be included on a digital certificate of the host banking system. To enable the trusted ATM component to further verify the public key of the host banking system, the host digital certificate may be signed by a certificate authority trusted by the TP and/or the trusted ATM component. The trusted ATM component may verify the digital signature of the certificate authority to verify the public key included in the digital certificate of the host banking system.

In an alternative exemplary embodiment, the terminal master key maybe securely stored by a trusted ATM component in sealed storage on a data store of the ATM computer rather than sending the terminal master key to an EPP. The trusted ATM component may then retrieve the terminal master key from sealed storage for use with decrypting communication keys provided to the ATM by the host banking system. The trusted ATM component may then securely transfer the decrypted communication key to the EPP. The EPP may use the communication key to encrypt personal identification numbers (PINs) inputted into a key pad input device of the EPP by a user performing a transaction at the ATM. The encrypted PIN may then be sent to the automated banking machine for use in authorizing the transaction to be performed.

In a further alternative exemplary embodiment, after the communication key has been decrypted, the communication key may be securely stored by the trusted ATM component in sealed storage on a data store of the ATM rather then sending the communication key to an EPP. The trusted ATM component may then retrieve the communication key stored from sealed to encrypt PINs inputted into a protected input device other than an EPP prior to sending the PINs to the host banking system for authentication. Such protected input devices may correspond to a keypad, keyboard, touch screen of a display device, or any other protected input device of the ATM which conforms to the previously described secure I/O defined by the TP specification of the TP of the ATM. For example, in this described alternative exemplary embodiment, a protected key pad or touch screen may be operatively configured to securely communicate an inputted PIN to the computer and trusted ATM component by establishing a secure encrypted communication channel between the input device and TP and/or trusted ATM component.

In exemplary embodiments where the cryptographic functions on the TPM chip are not sufficient for the cryptography requirements of the ATM, the exemplary TP may be operative to securely manage cryptographic calculations using protected cryptographic software and/or hardware components 332 which are external to the TPM. Such external cryptographic components 322 may include cryptography calculations performed by the CPU(s) of the computer of the ATM responsive to the TPM, nexus, TSS, a cryptography API of the Operating system, and/or a trusted ATM component.

In an exemplary embodiment, the TP may be used to measure and verify hardware devices and/or software of the ATM prior to enabling the ATM to perform transaction functions using the hardware devices and software. For example, the TP may be used to measure and verify that valid transaction function devices are installed in the ATM such as a cash dispenser and depository mechanism. The TP may also be used to measure and verify that other types of hardware devices of the ATM are valid such a card reader device, display screen, function keys, keypads, network card, hard drives or any other device that may be included in an ATM. In addition the TP may be used to measure and verify software components used to control the hardware devices of the ATM. Examples of such software devices which may be measured and verified by the TPM may include device drivers, configuration files, service providers, databases, XFS layers, ODS layers, TEC components, browser software, JVMs, terminal control software components, diagnostic software applications, server applications, service and maintenance software applications or any other software components including software files and data that may be included in an ATM.

In exemplary embodiments, where the ATM includes legacy components which operate in the standard mode or standard partition, the TP may be used to minimize the security risks such legacy components may pose to the ATM. For example ATMs may include an XFS layer which by itself may have limited functionality for securely controlling devices of the ATM. A TP may be used to measure and verify both the XFS layer and components that receive and send communications through an XFS layer of an ATM. Examples of an ATM system which is operative to establish secure communications between components of an XFS enabled ATM and which may be adapted to use a TP to establish such secure communications are shown in U.S. application Ser. No. 10/722,065 filed Nov. 24, 2003 which is incorporated herein by reference in its entirety.

For example, XFS enabled ATMs may include application layer components. Such application layer components may be operative to control XFS compatible hardware devices through communication with an XFS layer. In this described exemplary embodiment the application layer components above the XFS layer may correspond to trusted ATM components. In addition one or more of the device driver layer components or other software interfaces between the XFS layer and the hardware components may also be trusted ATM components. Examples of device driver layer components include device drivers, XFS service providers, and module interfaces such as unified base release (UBR) components or the Diebold Agilis module interface (AMI).

In an exemplary embodiment, to make communications with the XFS layer more secure, the device driver layer components may only be responsive to control hardware devices when the communication received from the XFS layer has been confirmed to originate from a trusted ATM component. In this exemplary embodiment, a security component of the ATM may be operative to supply this confirmation to the device driver layer components. For example, each time an application layer component communicates through the XFS layer, the application layer component may also notify the security manager component. The security manager component may then confirm to a device driver layer component that the communication received through the XFS layer originated from an authorized trusted ATM component. In this described exemplary embodiment, the application layer components, device driver layer components, and the security manager may use the attestation features of the TP to prove their identities to each other and to establish secure communication between them.

For example, a first application layer component may send a first communication to a security manager component of the ATM. The first communication may be attested to through use of the TP to enable the security manager component to authenticate the first communication. The application layer component may then send a second communication through the XFS layer of the ATM which is directed to the device driver layer of the ATM. In this described exemplary embodiment, the device driver layer may cause a hardware device of the ATM to operate responsive to both the second communication and the security manager.

In an exemplary embodiment the device driver layer may communicate with the security manager to verify that it may operate the hardware device responsive to the second communication. The communications from the security manager may be attested to through use of the TP to enable the device driver layer component to authenticate communications from the security manager.

In addition to using the TP to authenticate communications passed through an XFS layer, the TP may also be used to measure and verify that the software stack that corresponds to the components of the XFS layer, application layer and device driver layer are valid and have not been changed to an unauthorized configuration.

In an exemplary embodiment, the service software of the ATM may be operative to install and manage digital certificates used in the operation of the TP. Examples of digital certificates that may be managed on the ATM by the service software for one or more of the previously described TP specifications may include: validation certificate, TPM endorsement certificate, TPM identity certificate, conformance certificate, and platform certificate. The validation certificate may include data that includes TPM validation data statements and labeling. The endorsement certificate may be used to vouch for the existence of a particular TPM. The TPM identity certificate may include a public key for a TPM identity and a description of the TPM and/or TP. The conformance certificate may be issued by an entity chosen by the manufacture of the TP to vouch for the platform meeting the requirements of the specification for the ATM. A platform certificate may attest that the ATM TP platform has been built according to the manufacture of the ATM.

In the exemplary embodiment the service software of the ATM may include ownership management functions for managing a transition in ownership of the ATM: from the manufacture of the ATM to the entity responsible for installation of the ATM; to the institution or entity that operates the ATM; and to the entity that is responsible for maintenance of the ATM. The service software may be operative to manage in a trusted manner the identities and status settings for the TP as the ATM transitions from one entity to another.

The service software of the ATM may also be operative to perform secure backup and recovery functions of information stored on the TPM chip and/or other sealed storage managed by the TP. Such backups of information managed by the TP may also be securely stored on a system remote from the ATM in an encrypted form which can not be deciphered by the remote system. The service software of the ATM may also be operative to securely migrate selected information managed by a TP of an ATM to a TP of a trusted platform to support maintenance of the ATM.

In the exemplary embodiment the service software may include functions for managing changes to the TP and the trusted ATM applications. The service software 326 may modify the authorized states of the ATM that are measured and/or verified by the TP. The service software may enable different portions of the ATM to be configured based on the type of user performing the task. For example, an administrative user may be permitted to update the TP to trust new hardware and/or software installed on the ATM, while a maintenance user may be limited to updating a specific subset of the software and/or hardware configurations to be trusted by the TP. In the exemplary embodiment the TP may also be used to maintain an audit trail of all changes to the configuration of the ATM. Audit trail logs for operations of the TP and hardware and software components of the ATM may be securely stored in sealed storage on a data store of the ATM.

The exemplary embodiment of the ATM may be operative to prevent unauthorized software and hardware from being installed on the ATM. If such software is installed on the ATM, the TP may be used by the ATM to determine that the system has been modified or changed to an unauthorized software and/or hardware configuration. In an exemplary embodiment, when the system is modified to an unauthorized configuration, the TP may be used to prevent the ATM from booting, and/or loading into a fully enabled state.

As discussed previously, the TPM chip may include a digital certificate signed by the manufacture or supplier of the TPM or computer motherboard. Also as discussed previously the TP may also be used to acquire additional digital certificates for the ATM. Such additional certificates may be issued or signed by a specific certificate authority that is trusted by one or more trusted ATM components of the ATM. In an exemplary embodiment, the trusted ATM components may require the ATM to be issued one or more digital certificates from the specific certificate authority prior to becoming fully functional on the ATM. In addition, systems remote from the ATM such as a host banking system, financial transaction server, or other server, may also require the ATM to be issued one or more digital certificates from a specific certificate authority prior to performing functions with the ATM.

For example, a trusted ATM component of the ATM may include a device driver such as a service provider (SP) or other component which controls the operation of a cash dispenser. Such a cash dispenser device driver may only be operative to cause the cash dispenser to dispense cash, after the cash dispenser device driver has verified that the TP has possession of a particular private key. Such a private key may corresponds to a public key named in a digital certificate issued by a specific certificate authority that is trusted by the cash dispenser device driver. In an exemplary embodiment, communications received by the cash dispenser device driver may be digitally signed or attested to by the TP using the private key. If the public key associated with the digital certificate issued by the specific certificate authority is usable to verify the digitally signed or attested to communication, then the cash dispenser device driver may become operative to operate the cash dispenser in the ATM.

Although, in this example, a device driver has been described as being operative to authenticate the TP, it is to be understood that in exemplary embodiments other trusted ATM components may be operative to make this verification before enabling device drivers to operate hardware devices. For example in addition to service providers, the device driver layer of the ATM may include a module interface layer such as a UBR or an AMI which provides an additional layer of abstraction between the service providers and the hardware devices. One or more of the service providers may be programmed to control hardware devices through communication with the module interface components rather than directly communicating with one or more hardware devices. In this described embodiment, the module interface may be adapted to authenticate the TP before enabling one or more SPs to operate their respective hardware devices.

In further exemplary embodiments, the hardware devices themselves may only be operative to perform a function, after the hardware device has verified that the TP and/or associated device driver trusted ATM component has possession of a particular private key. Such a private key may corresponds to a public key named in a digital certificate issued by a specific certificate authority that is trusted by the hardware device. In an exemplary embodiment, communications received by the hardware device may be digitally signed or attested to by the TP and/or device driver trusted ATM component using the private key. If the public key associated with the digital certificate issued by the specific certificate authority is usable to verify the digitally signed or attested to communication, then the hardware device may become operative to perform a function in response to the communication.

In exemplary embodiments, the software associated with the TP may be operative to specify which SPs, device drivers, application or other ATM components are trusted and enabled to operate in the nexus mode or protected partition of the ATM TP as trusted ATM components. The ATM may include a user interface which enables an authorized user to grant individually or as a group, potential trusted ATM components permission to operate using the TP. Each trusted ATM component may include a manifest which includes a hash of the code of the program(s) or a public key(s) usable to verify digital signatures of the code of the program(s). The TP may be operative to authenticate each trusted ATM component using the information in the manifest. The manifest in turn may include a digital signature which can be authenticated by the TP to enable the trusted ATM component to operate in the ATM.

In addition to including software which specifies which applications installed on the ATM are trusted by and/or are granted permission to use the TP of the ATM, the ATM may include configuration applications which are operative to update the ATM with new authorized software configurations of the ATM responsive to a license or other accessed or inputted set of rules. Examples of an ATM platform which is operative to authorize the installation and/or configuration of software on the ATM and which may be adapted to use a TP to authenticate an installation and/or configuration of an ATM are shown in U.S. application Ser. Nos. 60/432,325 filed Dec. 10, 2002 and 09/957,982 filed Sep. 21, 2001 which are incorporated herein by reference in their entirety. In exemplary embodiments, license information for software being installed on an ATM may be securely stored in sealed storage in a data store of the ATM.

Examples of license information which may be securely stored in sealed storage may include: configuration rules for software applications and hardware devices of the ATM, software application expiration dates, the name of the customer, or entity licensing the software, serial numbers for the software application, version numbers for the software applications, authorization keys for the software applications, softwareIds, hardwareIds, or any other information which is associated with the ATM. Each time an ATM is booted and/or an application of the ATM is started in the ATM, the license information may be retrieved from sealed storage and compared to the state of the ATM as measured using the TP of the ATM. If the current measured state of the ATM does not correspond to the license information, the TP and/or ATM software may be operative to prevent the ATM from booting, and/or prevent the ATM software from running in an enabled state.

For example, in an exemplary embodiment, when new software is being installed in the ATM, the installation program may require that a technician input through an input device of the ATM a first authorization key and license information. The installation program may use the TP to generate a second authorization key responsive to a secret key stored in the machine and the inputted license information. The inputted first authorization key may then be compared to the generated second authorization key. If the inputted first authorization key corresponds to the generated second authorization key, the installation software may be operative to enable the new software application associated with the license information to be installed and/or configured on ATM and/or trusted to operating in the nexus mode or protected partition of the ATM TP.

In the exemplary embodiment the secret key used to generate the second authorization key may be securely embedded in the terminal control software, or other secure location in the ATM, including sealed storage. Also as will be explained below in more detail, the secret key may itself be generated responsive to keying material stored in one or more components of the ATM.

The process of installing the new software may include granting any new or updated trusted ATM components with permission to use and/or be trusted by the TP. For example, trusted ATM components may be granted permission to operate in the nexus mode or protected partition of the ATM TP. Also the TP may be updated to include authorized measurements for the newly installed software.

In alternative exemplary embodiments, the previously described TP may be provided in other types of self service terminals in addition to ATMs. Examples of other types of self service terminals which may include exemplary embodiments of the previously described TP may include kiosks, self check out systems, and electronic voting machines.

Figure 10:
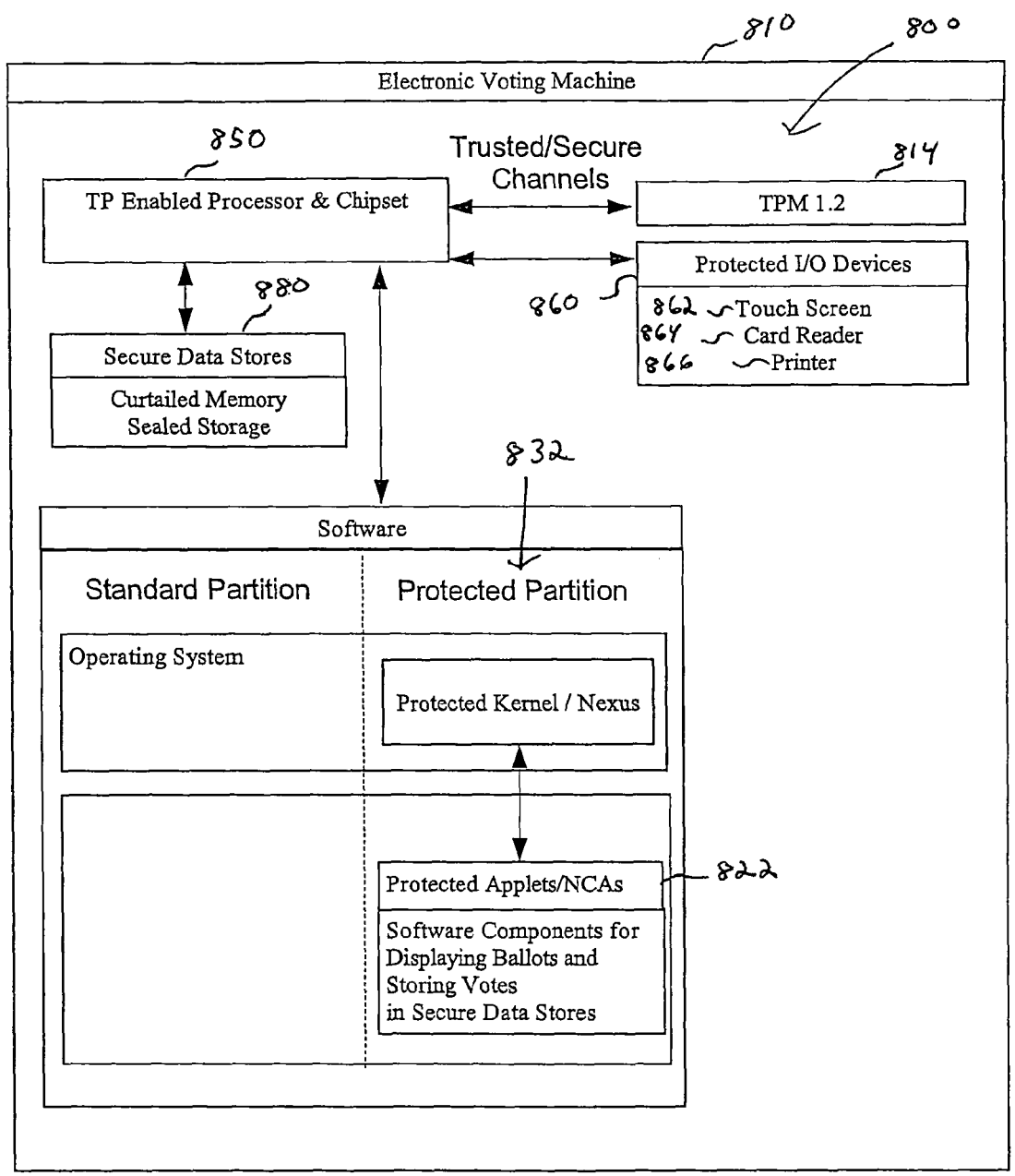
FIG. 10 shows a schematic view of a electronic voting machine which includes a trusted platform with a trusted platform module.

FIG. 10 shows an exemplary embodiment of a voting machine 810 which comprises a TP 800 with a TPM 814 in operative connection with a computer processor 850 of the voting machine. The voting machine may include protected input and/or output devices 860 adapted for use with the TP to establish trusted and secure communication channels between the processor and the input and/or output devices of the machine. For example, the voting machine may include a touch screen 862 that functions as both an input device and output device. The TP may be operate to establish a trusted and secure channel for receiving encrypted touch screen inputs from the touch screen. In addition the voting machine may include a protected video graphics controller which is adapted for use with the TP to establish a trusted and secure channel for receiving data from the processor for outputting a user interface through the touch screen. The exemplary embodiment of the video graphics controller may include video memory for example in which at least a portion of the video data stored therein is encrypted and secure from modification by an unauthorized component such as a virus or worm.

In the exemplary embodiment, the voting machine may include protected applets or NCAs, referred to herein as voting software components 822 which are operative in the protected partition 832 of the TP. The voting software components may be operative to cause the touch screen to output a user interface with information representative of a voting ballot. The voting machine may also include a card reader 864 or other input device which is operative to read ballot information from a portable memory device. Such a portable memory device for example may correspond to a smart card, flash memory card, or any other portable device which includes a data store for storing ballot information. The ballot information may include the precinct, political party or other information for which the user with the card is authorised to cast votes.

The exemplary embodiment of the voting machine may include one or more secure data stores 880 which include at least one of curtained memory areas and/or sealed storage managed by the associated protected memory management features of the computer processor, associated chipsets, TPM, and/or protected kernel of the voting machine TP.

In at least one of the secure data stores, the voting machine is operative to store election information representative of the candidates and issues capable of being voted on for one or more precincts, political parties or other groupings of election data. In an exemplary embodiment, the voting software components 822 of the voting machine are responsive to the election information accessed from a sealed storage of the machine and ballot information accessed from a portable memory device by the machine to cause the computer of the machine to generate a user interface through the touch screen which shows each of the candidates and issues the user is authorized to cast votes.

In an exemplary embodiment the card reader or other input device for reading ballet information may correspond to a protected input/output device which is adapted for use with a TP to establish a trusted and secure communication channel with the processor of the machine. In an exemplary embodiment the ballet information stored on the portable memory device may be digitally signed and/or encrypted. An exemplary embodiment of the voting software components may be operative to verify the digital signature associated with the ballet information and/or decrypt the ballet information prior to forming a user interface usable to cast votes.

In an exemplary embodiment, the voting software components may be operative to receive the inputs from the touch screen corresponding to votes cast by users of the machine for and against candidates and issues displayed by the touch screen. The inputs received by the voting software components may also correspond to other information associated with the voting process such as write in candidates. As used herein such inputs are referred to as voter inputted information. In the exemplary embodiment the voting software components may be operative to securely store the voter inputted information associated with a plurality of user's of the machine into one or more secure data stores.

Exemplary embodiments of the voting machine may further include a printer 866. The voting software components may be operative to cause the printer to output a printed ballot with indicia representative of the ballot information and/or voter inputted information. In an exemplary embodiment the printer may be adapted for use with a TP to establish a trusted and secure communication channel between the printer and the computer processor.

In further exemplary embodiments, the printer may be operative direct printed ballots into a ballot box or other storage chamber. Such ballots may be printed on individual cards and or printed on a continuous roll of paper which is cut by the printer between different sets of voter inputted information.

Prior to depositing a printed ballot into the ballot box, the printer may be operative to place the printed ballot into a location which is viewable by the user that provided the voter inputted information. The voting software components may further be operative to prompt the user to confirm that the printed ballot is accepted. In response to receiving an input representative of the ballot being accepted, the voting software components may be operative to cause the printer to move the ballot into the ballot box.

In an exemplary embodiment the printer may adapted to move a printed ballot to a further chamber other than the ballot box. In response to receiving an input representative of the ballot not being accepted, the voting software components may be operative to cause the printer to move the printed ballot into the further chamber.

In further exemplary embodiments, in response to receiving an input representative of the ballot not being accepted, the voting software components may be operative to cause the printer to mark the ballot with indicia representative of the ballot being designated as not accepted by the user. The printer may then be operative to move the marked ballot into the ballot box.

In an exemplary embodiment, the voting software components may be operative to enable the user through use of the touch screen to modify the previously provided voter inputted information and print a new ballot with the printer. In an exemplary embodiment, the voting software components may be operative to store voter inputted information in more than one secure data stores managed by the TP. In an exemplary embodiment, a first secure data store may correspond to the curtained memory of the voting software component. The curtained memory may include voter inputted information for a current ballot being viewed by a user. When the user wishes to modify the voter inputted information, the voting software components may be operative to cause the touch screen to redisplay one or more user interface screens representative of the previously provided voter inputted information accessed form the curtained memory associated with the voting software component.

When the user provides an input to the machine indicating that the ballot is accepted by the user, the voting software components of the machine may be operative to store the voter inputted information in at least one second secure data store. The at least one second secure data store may be operative to hold voter inputted information from a plurality of different users. In an exemplary embodiment the at least one second secure data store may correspond to sealed storage stored on a nonvolatile data store such as a hard drive or flash memory card. In a further exemplary embodiment, the voting software components may be operative to store the accepted voter imputed information in two or more secure data stores physically located on different data store devices. The two different memory devices for example may correspond to a sealed storage on a hard drive and an encrypted file stored on a portable storage device such as a flash memory card. The voting software components may also be operative to digitally sign the voter inputted information that is stored in the encrypted file.

In an exemplary embodiment, when an election is completed, the portable storage device cards with the encrypted voter inputted information may be removed from the machine and transported to a further machine capable of accumulating votes for an election from a plurality of different voting machines. In an exemplary embodiment the further machine may correspond to another voting machine which includes a voting software component with one or more cryptographic keys which are capable of decrypting and authenticating the voter inputted information from a plurality of different portable storage devices.

In exemplary embodiments, hardware devices of an ATM may include firmware which is modifiable. As an unauthorized update to the firmware of a device may be performed, an exemplary embodiment of the ATM may be operative to authenticate the firmware content of a hardware device using a challenge and response mechanism. In an exemplary embodiment the TP of the ATM may be used to store a measurement of the firmware content. The measurement may then be compared to a known or calculated authorized value. If the firmware content does not correspond to the known or calculated authorized value, the exemplary embodiment of the ATM may be operative to prevent the ATM from using the device and/or operating in an enabled mode. In alternative exemplary embodiments, the TP may be used to store the known authorized measurement or other value which correspond to valid firmware content. Future firmware content measurements may then be authenticated using the authorized measurements or other values previously stored using the TP.

In further exemplary embodiments, the ATM may be operative to measure the firmware of one or more hardware devices responsive to a request or challenge from a host banking system responsible for authorizing transaction functions performed at the ATM. The measurement may be reported back to the host banking system. The host banking system may compare the measurements of the firmware to known or calculated authorized values to determine if the firmware is valid prior to enabling or authorizing the ATM to perform transaction functions for users. As discussed previously, in exemplary embodiments, the measurement of the firmware may be measured using a TP of the ATM. However, it is to be understood that in alternative exemplary embodiments of the ATM, measurements may be taken by a further software or hardware device of the ATM and may be reported to the host banking system without using a TP. Also, in further exemplary embodiments, the ATM may be operative to authenticate the measurement and report to the host banking system the outcome or status of the authentication.

An exemplary embodiment for measuring and reporting firmware content of a hardware device may include sending a measurement request message to the hardware device which prompts the hardware device to return a firmware certificate (FWC). As discussed herein with regard to this described exemplary embodiment, a firmware certificate may correspond to a hash, digest, or MAC generated by the hardware device.

The measurement request message may include an initial value which is used by the hardware device to generate the firmware certificate (FWC). A different initial value (INV) may be sent to the hardware device each time a measurement is requested. The hardware device may be operative to calculate the firmware certificate (FWC) responsive to the Initial Value (INV) so as to produce a different firmware certificate for each different Initial Value (INV) received with a measurement request message.

In this described exemplary embodiment, the hardware device is operative to pass the entire content of the firmware, the Initial Value (INV), and a secret key (K) through a cryptographic algorithm which is operative to generate the firmware certificate (FWC). The firmware certificate cryptographic algorithm may be operative to generate a message authentication code (MAC) for use as the firmware certificate (FWC). In exemplary embodiments the cryptographic algorithm may include one or more one way hash function such as MD5 or SHA-1. In a further exemplary embodiment, the firmware certificate cryptographic algorithm may correspond to Cipher Block Chaining (CBC) or a Cipher-Feedback Mode (CFB) MAC algorithm where the firmware content is encrypted with a block algorithm in CBC or CFB modes. The firmware certificate (FWC) may then correspond to the last encrypted block which may be encrypted once more in CBC or CFB modes. In other exemplary embodiments other cryptographic algorithms may be used to generate a unique firmware certificate (FWC) responsive to the firmware content, a secret key (K) and an initial value (INV).

For example, the firmware content may be comprised of a number of bytes. To calculate the firmware certificate (FWC) the firmware content may be divided into blocks of bytes, called firmware blocks (FWB), numbered from 0 to −1. In an exemplary embodiment a block may be comprised of 8 bytes for example. As a result for a firmware content with 8 k bytes, the firmware blocks (FWBs) may be numbers 0 to 1023. The firmware blocks (FWBs) may be encrypted in CBC mode using a symmetrical encryption algorithm such as DES. As shown in equation (10), an initial value included in the measurement request message to the hardware device may be XORed with the first block (FWB0) of the firmware content.

$$C0 = DES(K, FWB0 \text{ xor } INV) \quad (10)$$

The result of the XOR may be encrypted with DES using a secret key (K) to produce a first cryptogram (C0). As shown in equation (11), each additional firmware block (FWBi) may be ZORed with the previous calculated cryptogram (Ci−1). The result of the XOR may be encrypted with DES using the secret key (K) to produce another cryptogram (Ci).

$$Ci = DES(K, Ci-1 \text{ xor } FWBi) \quad (11)$$

Equation 11 may be repeated until the last block but one. The firmware certificate (FWC) may be taken from a portion of the last cryptogram (Cn−2) such as the 6 rightmost digits of the last cryptogram (Cn−2). The firmware may then return the generated firmware certificate (FWC) to the component or system that issued the measurement request message.

In an exemplary embodiment of an ATM that includes a TP, the firmware certificate may be securely stored by the TP and compared to a known authorized value for the firmware certificate. Also, as described previously, the firmware certificate may be reported to a host banking system for comparison by the host banking system to an authorized value for the firmware certificate. Such a known authorized value may be calculated in the same manner as described previously for the firmware using the same cryptographic algorithm that is responsive to a know authorized firmware content, the secret key, and the initial value to generate a firmware certificate. The received firmware certificate may then be compared to the generated firmware certificate to validate the firmware content in the hardware device.

In the exemplary embodiment of the ATM which includes the TP, the TP may be used to store the measurement of the firmware. Responsive to a call from another component or the host banking system, the TP may attest to the measurement by signing the measurement with a private key of the TP. The digitally signed measurement may then be forwarded to the calling component or host banking system. The calling component or host banking system may then validate the digital signature of the TP and authenticate the measurement by comparing the measurement to a known or calculated authorized value for the firmware certificate.

In a further exemplary embodiment the firmware certificate may be generated by the hardware device by passing the firmware content through a one way hash algorithm such as MD5 and SHA-1. The resulting one way hash digest may then be combined with the initial value (INV) received in the measurement request message. The combined digest and initial value may then be encrypted with a symmetrical encryption algorithm such as DES using the secret key (K) to produce a firmware certificate that varies responsive to each different initial value. In this described exemplary embodiment, the combination of the digest and initial value may also be hashed with a one way hash function prior to encrypting the result with DES. The resulting firmware certificate may be authenticated using the TP, host banking system, or other component by taking a known valid one way hash digest of the firmware, combining it with the initial value (INV) and encrypting it using DES and the secret key. The measured firmware certificate and the value generated responsive to a known hash of the firmware may then be compared to authenticate the firmware in the hardware device.

In a further exemplary embodiment, the automated banking machine may include a software component that is operative to send the certificate request message to one or more hardware devices in the machine. In response to receiving the certificate request messages, the hardware devices may then generate and return the firmware certificates to the calling software component. The software component may then authenticate each firmware certificate using one of the preciously described authentication methods. The results of the authentications for one or more devices may then be communicated in a message to a host banking system. If the message is indicative of the firmware certificates being valid, the host banking system may be operative to provide authorization messages for one or more transactions being performed by the automated banking machine. If the message is indicative of at least one of the firmware certificates not being valid, the host banking system may be operative to propagate a request to have the machine serviced.

The previously described exemplary methods of measuring firmware content may also be used to measure other groupings of bytes including software files or other groupings of data stored on a hard drive or other data store of the ATM. However, it is to be understood that other measurements may be taken in different forms. For example measurements may correspond to the reading of embedded hardware or software IDs in the components. Measurements may also correspond to having a component digitally sign a random number or other information to verify that the component has possession of a private key. Also as discussed previously measurements may also be made by generating a hash of the code of a component and comparing the hash to a hash retrieved in a signed and trusted manifest or certificate associated with the component. In alternative exemplary embodiments, measurements performed by components of the ATM, TP and/or host banking system may correspond to any evaluation of a component which is operative to produce information useful for authenticating the component.

As discussed previously, an exemplary embodiment of the ATM may use a TP to securely store encrypted secrets on the ATM using sealed storage. Each trusted ATM component may access functions of the TP for use with sealing or unsealing secret data stored on the ATM. In addition exemplary embodiments of an ATM may be operative to store encrypted information on the ATM without using a TP. Such an ATM may include one or more secret keys for encrypting, decrypting, and other cryptographic process. Such keys must be available for use even after the machine has been shut down, restarted, or serviced. Although such keys may be stored in a non-volatile media such as a hard drive, an exemplary embodiment may be operative to have periodic access to the secret keys without storing the keys on a potentially insecure hard drive or other long term storage medium. In this described exemplary embodiment, the ATM may be operative to generate and re-generate the secret keys as required when the system is re-booted, re-installed, serviced and/or when the secret keys are needed.

An exemplary embodiment of the ATM may generate or re-generate the identical key by combining keying material provided by the calling application, other software applications, the operating system and/or hardware devices of the ATM. The combination of this keying material results in a key.

In this described exemplary embodiment the terminal control software for the ATM may include a function for generating the key. Portions of the keying material may be supplied as one or more arguments to the key generation function from a calling application. Such arguments may include for example a data name, an application name, a password, a machine identification number, or any other information that the calling application can reproducibly pass to the function. In an exemplary embodiment, the key generation function may require at least one of the arguments, while the other arguments may be optionally supplied by the calling application. For example, the data name argument may be required, whereas other arguments such as the application name, password, and machine identification number may be optional.

The data for these arguments may be arguments form the application that calls the key generation function. Also these arguments may be external data used by the calling application from outside the application and passed to the key generation function. For example, the calling application may pass a machine identification number to the function which is unique to the ATM. Such a machine identification number may correspond to a processor ID, an operating system machine ID, or any other information which is unique to the computer, hardware, or software of the ATM and which is accessible to the application calling the key generation function. In a further exemplary embodiment, the key generation function may be operative to directly access the machine identification number. In this case, the key generation function may accept a boolean argument from the calling application which specifics whether or not the key generation function should access and use the machine identification number as part of the keying material.

In the exemplary embodiment, the key generation function may also use one or more constant or static data items for use as additional keying material. Such constant data may be defined within the key generation function.

The exemplary embodiment of the key generation function may use one or more hashing functions such as MD5 or SHA-1 to produce a one-way hash number from a combination of the keying material available to the key generation function. The resulting one-way hash number may correspond to a 128 bit value, 168 bit value, or other value that is usable as a reproducible key for encrypting and decrypting information with the ATM.

To further increase the security of the encrypted data, the ATM may use the generated key in combination with a random salt value. Each time the generated key is used to encrypt data, the ATM software performing the security function may generate a random or unique salt value. The salt value may be hashed with the generated key to introduce greater variability in keys. The resultant key, referred to herein as a salted key, may then be used to encrypt the data at the ATM with a symmetrical encryption algorithm such as DES or AES for example. Because the salted key can only be re-produced if the salt value is known, the software which generated the encrypted data using the salted key may augment the salt value with the encrypted data.

To decrypt the encrypted data, the salt value may be removed from the encrypted data. The ATM application decrypting the data may access or re-generated the key using the previously described key generation function. The generated key may then be hashed with the salt value associated with the encrypted data to re-generate the salted key. The salted key may then be used to decrypt the encrypted data using the symmetrical algorithm.

In addition to encrypting and decrypting ATM data using the generated and resulting salted key, the ATM may also perform other cryptographic operations using the generated and resulting salted keys such as generating a message authentication code (MAC) for ATM data.

Thus the new automated banking machines and other self-service terminals described herein achieve one or more of the above stated objectives, eliminates difficulties encountered in the use of prior devices and systems, solves problems and attains the desirable results described herein.

In the foregoing description certain terms have been used for brevity, clarity and understanding, however no unnecessary limitations are to be implied therefrom because such terms are used for descriptive purposes and are intended to be broadly construed. Moreover, the descriptions and illustrations herein are by way of examples and the invention is not limited to the exact details shown and described.

In the following claims any feature described as a means for performing a function shall be construed as encompassing any means known to those skilled in the art to be capable of performing the recited function, and shall not be limited to the features and structures shown herein or mere equivalents thereof. The description of the exemplary embodiment included in the Abstract included herewith shall not be deemed to limit the invention to features described therein.

Having described the features, discoveries and principles of the invention, the manner in which it is constructed and operated, and the advantages and useful results attained; the new and useful structures, devices, elements, arrangements, parts, combinations, systems, equipment, operations, methods and relationships are set forth in the appended claims.

We claim:

1. Apparatus comprising:
an automated banking machine that operates responsive at least in part to data read from data bearing records to cause financial transfers, including
a plurality of hardware components,
wherein the plurality of hardware components include a card reader operative to read card data on user cards corresponding to financial accounts,
wherein at least one of the hardware components includes at least one processor and stored firmware content stored in the hardware component,
wherein the firmware content is operative to execute in the at least one processor of the at least one hardware component to cause the at least one hardware component to carry out at least one transaction function,
wherein the at least one of the processor of the at least one hardware component is operative to receive at least one measurement request message,
wherein the at least one of the processor of the at least one hardware component is operative responsive at least in part to the measurement request message to use at least a portion of the firmware content to generate a firmware certificate; and
at least one computer,
wherein the at least one computer is operative to receive the firmware certificate from the at least one hardware component,
wherein the at least one computer is operative to cause the firmware certificate to be authenticated,
wherein responsive at least in part to authentication of the firmware certificate, the at least one computer is operative to cause the at least one hardware component to perform the at least one transaction function, which includes execution of at least a portion of the firmware content by the at least one processor.

2. The apparatus according to claim 1, wherein the at least one computer is operative to cause the measurement request message to be sent to the at least one hardware component.

3. The apparatus according to claim 2, wherein the at least one computer is operative to cause a message to be sent to a host banking system, which causes the firmware certificate to be authenticated, wherein the least one computer is operative to receive an authorization message from the host banking system responsive at least in part to authentication of the firmware certificate.

4. The apparatus according to claim 2, wherein the at least one hardware component corresponds to the card reader, wherein the at least one transaction function includes reading a card with the card reader.

5. The apparatus according to claim 2, wherein the plurality of hardware components includes a cash dispenser, wherein the at least one hardware component corresponds to the cash dispenser, wherein the at least one transaction function includes dispensing cash with the cash dispenser.

6. The apparatus according to claim 2, wherein the at least one computer is operative to authenticate the firmware certificate.

7. The apparatus according to claim 2, wherein the at least one hardware component includes a key stored therein, wherein the at least one processor in the at least one hardware component is operative to use the key to generate the firmware certificate.

8. The apparatus according to claim 6, wherein the measurement request message includes an initial value, wherein the at least one processor in the at least one hardware component is operative to use the key and the initial value to generate the firmware certificate.

9. The apparatus according to claim 8, wherein the at least one processor in the at least one hardware component is operative to use a one-way hash function algorithm to generate the firmware certificate.

10. The apparatus according to claim 8, wherein the at least one processor in the at least one hardware component is operative to use a symmetrical encryption algorithm to encrypt the firmware content to generate the firmware certificate.

11. The apparatus according to claim 10, wherein the at least one processor in the at least one hardware component is operative to use a symmetrical encryption algorithm in Cipher Block Chaining mode to encrypt the firmware content to generate the firmware certificate.

12. The apparatus according to claim 10, wherein the at least one processor in the at least one hardware component is operative to use a Cipher-Feedback Mode (CFB) MAC algorithm to encrypt the firmware content to generate the firmware certificate.

13. The apparatus according to claim 8, wherein the at least one processor in the at least one hardware component is operative to encrypt a one way hash of the firmware content with a symmetrical encryption algorithm and the key to generate the firmware certificate.

14. The apparatus according to claim 8, wherein the at least one processor in the at least one hardware component is operative to use a symmetrical encryption algorithm and the key to encrypt a combination of a one-way hash of the firmware content and the initial value to generate the firmware certificate.

15. The apparatus according to claim 8, wherein the at least computer is operative to cause different certificate request messages to be sent at different respective times to the at least one hardware component, wherein each different certificate request message includes a different initial value.

16. The apparatus according to claim 6, wherein the at least one computer is operative to determine an authorized value, wherein the at least one computer is operative to authenticate the firmware certificate responsive at least in part to a determination carried out by the at least one computer that the firmware certificate and the authorized value have a predetermined relationship.

17. The apparatus according to claim 16, wherein the at least one computer is operative to prevent the at least one hardware component from carrying out the at least one transaction function responsive at least in part to the at least one computer determining that the firmware certificate and the authorized value do not have the predetermined relationship.

18. Apparatus comprising:
  an automated banking machine that operates responsive at least in part to data read from data bearing records to cause financial transfers, including
    a plurality of hardware components,
      wherein the plurality of hardware components include a card reader operative to read card data on user cards corresponding to financial accounts,
    wherein at least one of the hardware components includes at least one processor,
    wherein the at least one hardware component includes firmware content and at least one stored key,
    wherein the firmware content is operative to execute in the at least one processor of the at least one hardware component to cause the at least one hardware component to carry out at least one transaction function,
    wherein the at least one processor of the at least one hardware component is operative to receive data from at least one computer,
    wherein the at least one of the processor of the at least one hardware component is operative to use at least a portion of the firmware content and at least a portion of the received data, and the at least one key to generate a firmware certificate; and
    wherein the at least one of the processor of the at least one hardware component is operative to communicate the firmware certificate to the at least one computer.

19. The apparatus according to claim 18, wherein the at least one of the processor of the at least one hardware component is operative to use a symmetrical encryption algorithm and the at least one key to encrypt at least a portion of the firmware content and at least a portion of the received data to generate the firmware certificate.

20. The apparatus according to claim 19, further comprising the at least one computer, wherein the at least one computer is operative to determine an authorized value, wherein the at least one computer is operative to authenticate the firmware certificate responsive at least in part to a determination carried out by the at least one computer that the firmware certificate and the authorized value have a predetermined relationship, wherein responsive at least in part to authentication of the firmware certificate, the at least one computer is operative to cause the at least one hardware component to carry out the at least one transaction function.

* * * * *